United States Patent
Taleyarkhan et al.

(10) Patent No.: US 10,442,966 B2
(45) Date of Patent: Oct. 15, 2019

(54) POLYLACTIC ACID ADHESIVE COMPOSITIONS AND METHODS FOR THEIR PREPARATION AND USE

(71) Applicant: PURDUE RESEARCH FOUNDATION, West Lafayette, IN (US)

(72) Inventors: Rusi Taleyarkhan, Lafayette, IN (US); Alexander Charles Bakken, Lafayette, IN (US); Kevin F. Fisher, Lafayette, IN (US); Alexander R. Hagen, Lafayette, IN (US); Neal P. Kostry, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 118 days.

(21) Appl. No.: 14/443,248

(22) PCT Filed: Nov. 15, 2013

(86) PCT No.: PCT/US2013/070399
§ 371 (c)(1),
(2) Date: May 15, 2015

(87) PCT Pub. No.: WO2014/078720
PCT Pub. Date: May 22, 2014

(65) Prior Publication Data
US 2015/0322310 A1    Nov. 12, 2015

Related U.S. Application Data

(60) Provisional application No. 61/726,941, filed on Nov. 15, 2012.

(51) Int. Cl.
*C09J 167/04* (2006.01)
*C08L 67/04* (2006.01)
(Continued)

(52) U.S. Cl.
CPC .............. *C09J 167/04* (2013.01); *B32B 7/12* (2013.01); *B32B 37/06* (2013.01); *B32B 37/10* (2013.01);
(Continued)

(58) Field of Classification Search
None
See application file for complete search history.

(56) References Cited

U.S. PATENT DOCUMENTS 3,966,669 A * 6/1976 Wolfe .................... C09D 5/032
                                                                523/171
5,753,724 A * 5/1998 Edgington ............. C08G 63/08
                                                                523/124
(Continued)

FOREIGN PATENT DOCUMENTS

DE    102005004789 A * 8/2006
JP     11-060716 A * 3/1999
(Continued)

*Primary Examiner* — Vivian Chen
(74) *Attorney, Agent, or Firm* — Purdue Research Foundation; Zhigang Rao

(57) ABSTRACT

New adhesives and methods for preparing them are disclosed that include polylactic acid irradiated with gamma radiation, such as by a $Co^{60}$ source. Irradiation times are used that improve the characteristics of the adhesive materials. Generally, the dose of radiation is from about 5 kGy to about 200 kGy of gamma irradiation. The adhesives generally have melting temperatures in the range of at least about 140 to about 148° C. such that they can be conveniently used in conventional glue guns and other glue equipment. The disclosed adhesives can provide bond strengths in the range of about 1,600 psi or more to about 2,500 psi or more. The disclosed adhesives can include a crosslinking agents. They can be used to join a wide range of substrates including wood, metal, plastic, ceramic, glass or combinations of substrates. They can be conveniently prepared by heating a
(Continued)

polylactic acid (polylactic acid) preparation and mixing the molten polylactic acid with one or more crosslinkers when present. The molten mixture can then be and the polylactic acid can be irradiated with the desired dose of gamma radiation. Irradiation can occur before during or after mixing with the crosslinking agent and before or after shaping into the desired shape or even after use to join substrates. The adhesives can be used to join substrates by any known method once heated to a molten state.

18 Claims, 17 Drawing Sheets

(51) Int. Cl.
| | |
|---|---|
| B32B 27/36 | (2006.01) |
| B32B 27/16 | (2006.01) |
| B32B 7/12 | (2006.01) |
| B32B 37/06 | (2006.01) |
| B32B 37/10 | (2006.01) |
| B32B 37/12 | (2006.01) |
| B29C 65/48 | (2006.01) |
| B29C 65/40 | (2006.01) |
| B29C 65/42 | (2006.01) |
| C08K 5/1535 | (2006.01) |
| C08K 5/11 | (2006.01) |
| B29C 65/62 | (2006.01) |
| C08K 5/00 | (2006.01) |
| B29K 67/00 | (2006.01) |

(52) U.S. Cl.
CPC .............. *B32B 37/12* (2013.01); *C08K 5/11* (2013.01); *C08K 5/1535* (2013.01); *B29C 65/40* (2013.01); *B29C 65/42* (2013.01); *B29C 65/425* (2013.01); *B29C 65/48* (2013.01); *B29C 65/483* (2013.01); *B29C 65/4805* (2013.01); *B29C 65/486* (2013.01); *B29C 65/487* (2013.01); *B29C 65/4815* (2013.01); *B29C 65/4855* (2013.01); *B29C 65/4865* (2013.01); *B29C 65/4875* (2013.01); *B29C 65/62* (2013.01); *B29K 2067/06* (2013.01); *B32B 27/16* (2013.01); *B32B 27/36* (2013.01); *B32B 37/1284* (2013.01); *B32B 2037/1215* (2013.01); *B32B 2250/03* (2013.01); *B32B 2367/00* (2013.01); *C08K 5/0025* (2013.01); *C08L 67/04* (2013.01); *C08L 2312/06* (2013.01); *C09J 2467/003* (2013.01); *Y10T 428/3162* (2015.04); *Y10T 428/31681* (2015.04); *Y10T 428/31786* (2015.04); *Y10T 428/31794* (2015.04)

(56) References Cited

U.S. PATENT DOCUMENTS

| | | | |
|---|---|---|---|
| 8,101,675 B2 * | 1/2012 | Harris | C08G 63/91 241/14 |
| 2002/0068810 A1 * | 6/2002 | Whitehouse | A23C 19/163 528/272 |
| 2005/0026063 A1 * | 2/2005 | Komoto | G03G 9/08702 430/109.1 |
| 2008/0213209 A1 * | 9/2008 | Kanazawa | C08J 3/24 424/78.31 |
| 2008/0234754 A1 * | 9/2008 | McCarthy | A61B 17/00491 606/298 |
| 2008/0293843 A1 * | 11/2008 | Harris | C08G 63/91 522/176 |
| 2010/0069469 A1 * | 3/2010 | Young | A61K 6/033 514/44 R |
| 2011/0047739 A1 * | 3/2011 | Kinoshita | B60S 1/0402 15/250.31 |
| 2012/0052234 A1 * | 3/2012 | Natarajan | B29C 33/424 428/99 |
| 2012/0053261 A1 * | 3/2012 | Pravata | A61L 15/58 523/118 |
| 2012/0143228 A1 * | 6/2012 | Natarajan | A61F 2/0063 606/151 |
| 2012/0208016 A1 * | 8/2012 | Takahira | B32B 27/00 428/355 R |
| 2014/0227543 A1 * | 8/2014 | Taleyarkhan | C09D 167/04 428/480 |

FOREIGN PATENT DOCUMENTS

| | | | |
|---|---|---|---|
| JP | 2000-086877 A | * | 3/2000 |
| JP | 2011-032301 A | * | 2/2011 |

* cited by examiner

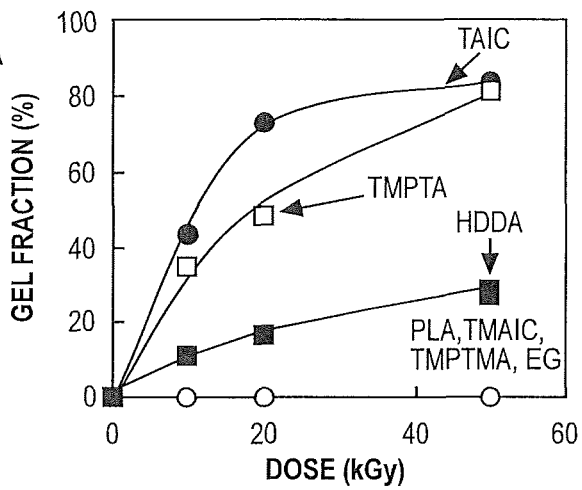
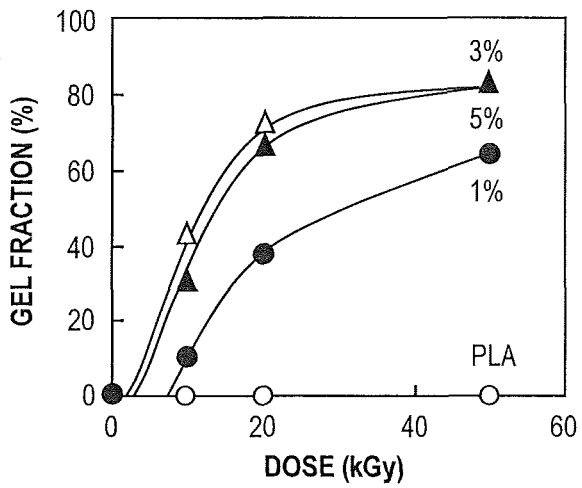
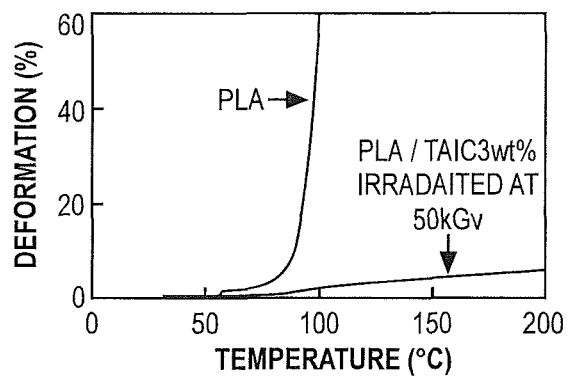

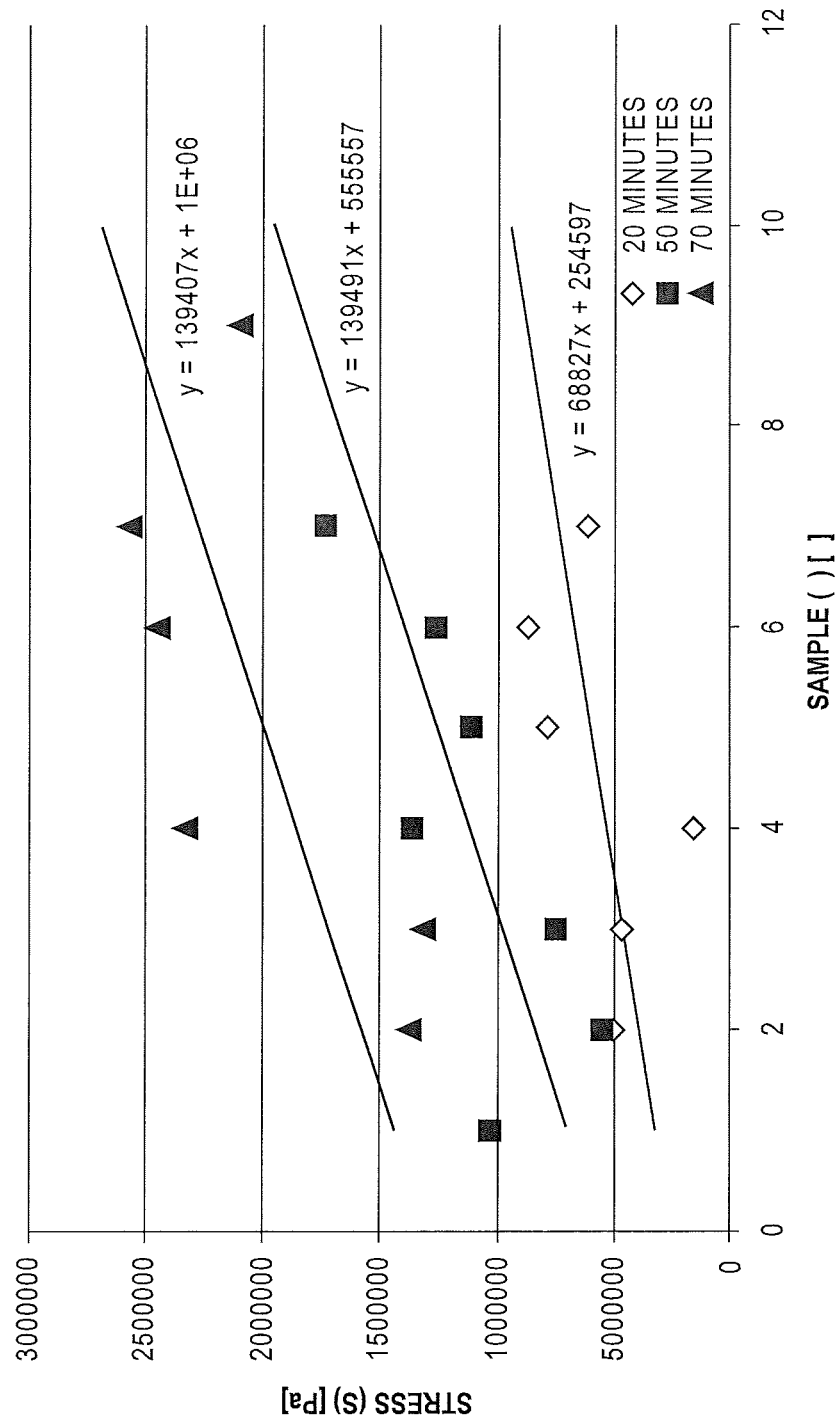

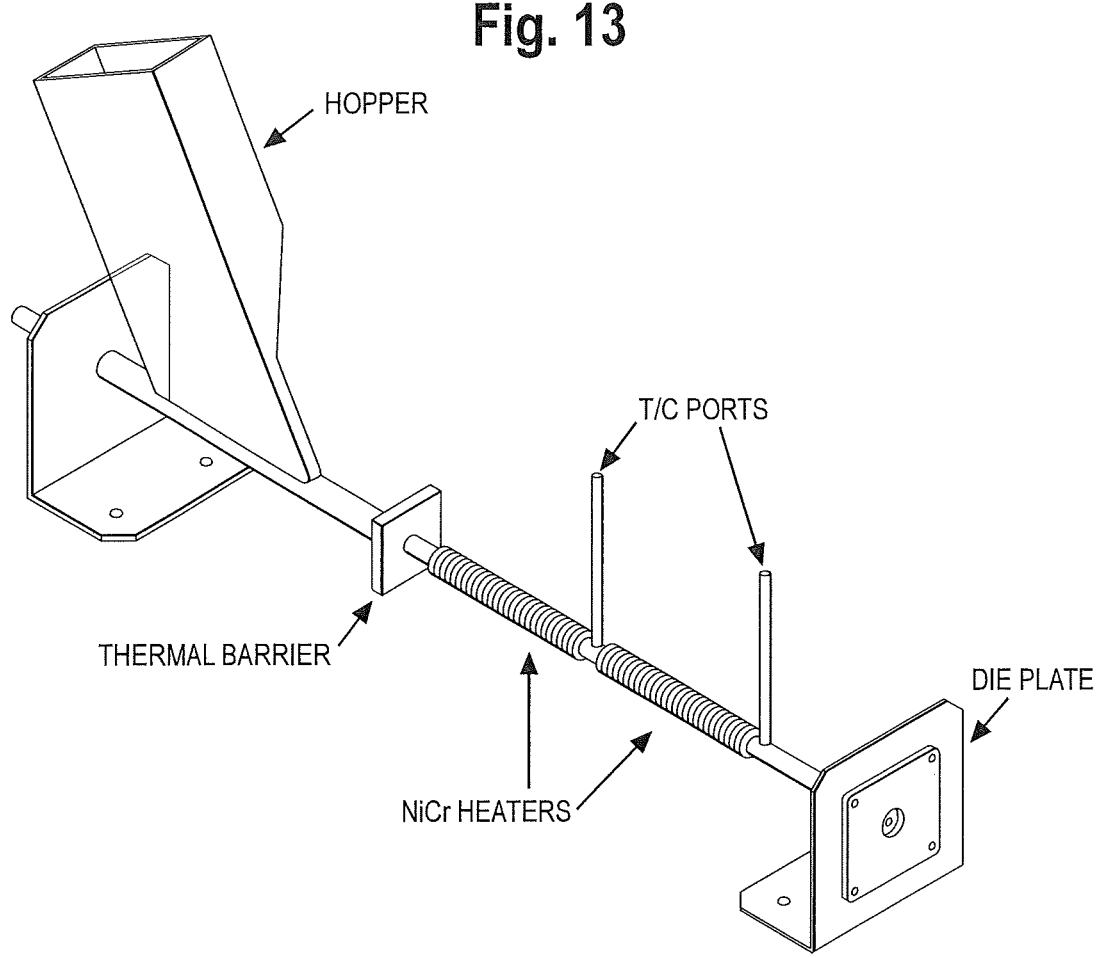

Fig. 16

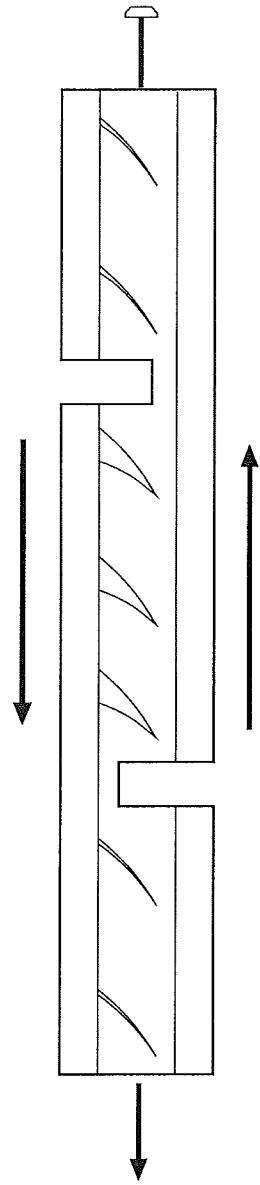

LEFT: THIS IMAGE DEPICTS A TWO LAYER LAMINATE FROM THE SIDE VIEW. THE ADHESIVE LAYER IS PURPOSEFULLY SHOWN MUCH LARGER THAN REAL LIFE PROPORTIONS TO DEMONSTRATE THE REQUIREMENT OF REMOVING 2/3 OR MORE OF THE

BOTTOM: THIS IMAGE DEPICTS THE TOP DOWN VIEW OF SAMPLES WHICH ARE BEING CUT TO ASTM DIMENSIONS. THE INDIVIDUAL TEST SPECIMENS MUST BE 3.25" X 1" WITH 1/8" CUTS ON EACH OPPOSING SIDE OF THE 1"X1" TEST AREA. DASHED LINES INDICATE THAT A CUT WAS MADE ON

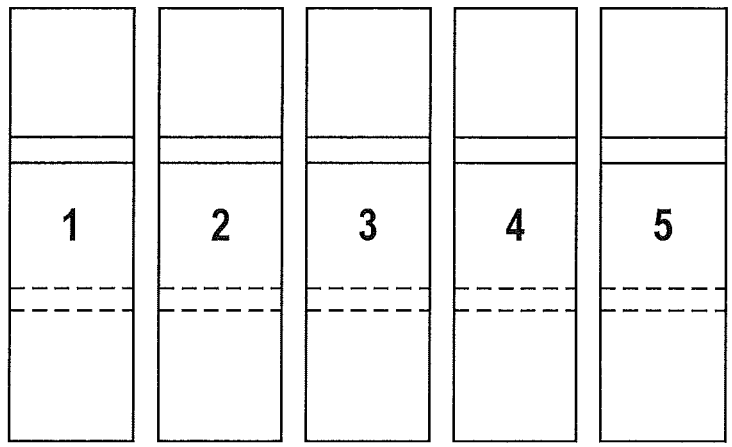

POLYLACTIC ACID ADHESIVE COMPOSITIONS AND METHODS FOR THEIR PREPARATION AND USE

BACKGROUND

Natural adhesives such as animal glues, fish glues, vegetable glues and casein (the main protein in milk) are generally set upon solvent preparation and offer low strength and are susceptible to moisture and mold. Their use is mainly for joining low strength materials.

Elastomer adhesives such as natural rubbers, neoprene, acrylonitride budadiene, butyl/rubber adhesives, styrene butadiene rubber adhesives, polyurethane adhesives, polysulphide rubber adhesives, and silicone rubber adhesives are based on natural and synthetic rubbers set by solvent evaporation or heat curing; they have relatively low strength and suffer from creep and therefore are not usually used for stressed joints. More typically, they are used for flexible bonding of plastics and rubbers.

Thermoplastic adhesives such as polyvinyl acetate (PVA), polyvinyl alcohol (PVA), polyacrylates, polyester acrylics, acrylic solvent cement, cyananoacrylates (superglue), silicone resins, polyamides and acrylic acid diesters have low/medium strength and may suffer from creep and attack from water but not from oils.

Thermoset adhesives such as phenol formaldehyde (PF) resins, phenolic neoprene, polyesters, polymides and epoxy resins set as a result of the buildup of rigid molecular chains with cross-linking.

Toughened rubber modified adhesives include small rubber-like particles dispersed throughout a glassy matrix are resistant to crack propagation and have been applied to acrylic and epoxy-based adhesives.

The general performance characteristics of these adhesives in terms of shear strength and range of operating temperatures are summarized in the table below.

TABLE 1

Properties of conventional adhesives

| Adhesive Type | Shear strength (MPa) | | Operating temperature (C.) | |
|---|---|---|---|---|
| | Min. | Max. | Min. | Max. |
| Rubber | 0.35 | 3.5 | −20 | 150 |
| PVA (white glue) | 1.4 | 6.9 | | |
| Cyanoacrilate | 6.9 | 13.8 | | 80 |
| Anaerpbo | 6.9 | 13.8 | | 200 |
| Polyurethane | 6.9 | 17.2 | −200 | 150 |
| Rubber modified epoxy | 13.8 | 24.1 | −40 | 90 |
| Epoxy | 10.3 | 27.8 | | 200 |
| Polymide | 13.8 | 27.6 | | 350 |
| Rubber modified epoxy | 20.7 | 41.4 | | 180 |

Note:
1 MPa = 10 bar about 147 psi; 1,000 psi = about 6.9 MPa

The strength of adhesive joint is dependent on how well the adhesive has bonded to the surface of a material (i.e., substrate), as well as on the cohesive strength of the adhesive itself. It is noted from Table 1, that, for the most part, the maximum bonding strength attainable from the range of conventional adhesives is about 28 MPa (4,000 psi). Virtually all of them use ingredients which emit or themselves emit volatile organic compounds (VOCs) and they require set times ranging from minutes to tens of minutes to days, and the operating temperatures are generally below 150-200° C.

Limitations on adhesives that are currently known in the marketplace include their lability in the presence of solvents like acetone and water. The surfaces they join often require careful surface preparation such as degreasing with steam, organic solvents or alkaline cleaners; mechanical methods applications such as blasting, brushing, or grinding; dipping in boiling water after etching in caustic soda; yellow or green chromate treatment; anodizing in chromic, phosphoric or sulphuric acid. Many adhesives require long times to set before allowing use of the joined substrates (e.g., Gorilla Glue asks for 24 h post-application).

Many materials are difficult to bond with adhesives and require specialized surface preparation. This is the case for substrates such as teflon (PTFE), marble aluminum (and alloys); copper (and alloys); magnesium (and alloys); nylon, polyacetal, polyethelene, polypropylene, PVC, zinc; and glass. Such substrates often require use of primers.

Commonly, adhesive-based joints are not as strong or reliable as a fastened joint. This is especially true for susceptibility to peel loads, although simple methods such as use of double lap joints can be deployed to ameliorate such limitations. In addition, the temperature range for application can be much lower than that for fastened joints.

Most adhesives present toxicity issues due to volatile organic compounds (VOCs) and the presence of harmful chemicals such as formaldehyde. Such compounds are often used to provide for liquid state handling of adhesives during processing at room temperature.

New adhesives are needed that have improved fatigue behavior and reduced stress concentration zones. They should be easy to use such as by controlling viscosity, allowing for high throughput uses, and have sealing capability such that the adhesive joint can seal joined materials from moisture and air. In addition they should not melt or otherwise modify the substrates they are intended to join, they should be amenable to use in joining a broad range of substrates including difficult substrates to join adhesively such as teflon, marble and aluminum substrates and they should be of minimal volume. Any new adhesives technology that can overcome some or all of the limitations mentioned above are needed. Ideally new adhesives can be used in an aqueous state without the need for volatile organics.

SUMMARY OF INVENTION

New adhesives and methods for preparing them are disclosed. The adhesives include polylactic acid that is irradiated with photon radiation such as gamma radiation as by a $Co^{60}$ source or an electron beam. This radiation produces effects similar to that from electron and recoil ion based irradiation such as from neutrons. Irradiation times can be manipulated to tailor adhesive properties for specific uses and generally to improve the characteristics of the adhesive materials. Generally, the dose of radiation is from about 5 kGy to about 200 kGy.

The adhesives generally have melting temperatures in the range of at least about 140 to about 148° C. such that they can be conveniently used in conventional glue guns and other glue dispensing equipment, such as sprayers. The melting temperature can be increased to over 200° C. using a combination of thermal treatment and irradiation as described. These treatments enhance resistance to water after the treated adhesive is applied and put into service. The same treatments can also be carried out after the adhesive is applied to the same affect. The improved characteristics of the polylactic acid adhesives are correlated with their absorbance which increases with time of irradiation. This can be conveniently measured using a spectrophotometer at wavelengths in the range of 330 to about 545 nm light and have absorbances in the range of about 0.9 or more to about 1.2. The disclosed adhesives provide bond strengths in the range of about 100 psi to about 6,500 psi or more when applied to a wide range of substrates.

The melting temperature of the adhesives can be increased to over 200° C. by varying thermal and irradiation treatments of the adhesive material. Such treatments can also be used to improve water resistance of the disclosed adhesives.

The disclosed polylactic acid adhesive is generally made of L(−) lactic acid and can be partially or primarily crystalline or amorphous. The disclosed adhesives can include a crosslinking agent such as TAIC, TMAIC (Trimethylallyl isocyanurate), TMPTA (Trimethylolpropane trimethacylate), HDDA (1,6-Hexanedisol diacrylate), joncryl AdzR-4368F, PCL (polycaprolactone), and their mixtures. The disclosed adhesives can also include plasticizers and preferably biodegradable plasticizers to ensure the resulting product remains "green." Such agents include Proviplast®: 01422, 2624, 25102, 25422 (di-tetrahydrofurfuryl-succinate, bis(tetrahydrofurfuryl-2-ylmethyl)butanedioate, ethoxylated aliphatic diester; and bis(2-(2-butoxyethoxy) ethyl)adipate) which can be added at concentrations that give a wide range of hardness and elasticity. Conventional tackifiers and filler materials can also be included to tailor the overall volume, tackiness and density of the resulting adhesive product.

The disclosed adhesives can be used to join a wide range of substrates including wood, metal, plastic, ceramic, glass or combinations of substrates. Metals such as copper, aluminum, steel, their alloys and their mixtures can be joined and plastics such as teflon, nylon, polyacetal, polyethelene, polypropylene, PTFE, PVC can be joined by standard methods such as by glue guns, spray guns, powdered layers followed by thermo-compressive treatment when desired. In addition the adhesives can be used to fill holes in substrates. Relatively little if any curing time is required before the joined materials can be used.

The adhesives can be conveniently prepared by heating a polylactic acid (PLA) preparation and mixing the molten PLA with one or more crosslinkers when present. The molten mixture can then be shaped to any desired shape, such as into a cylinder for use in a conventional glue gun. The PLA can be irradiated with the desired dose of gamma radiation before, during, or after mixing with the crosslinking agent and before or after shaping into the desired shape or even after use to join substrates.

The adhesive can be prepared by heating the raw PLA resin to a temperature in the range of about 220 to about 290° C. and held at that temperature for a suitable period of time to give the adhesive characteristics required for the particular use. Longer heating times provide lower melting temperatures and faster glue dispensing due to reduced adhesive viscosity. Plasticizers, cross-linking agents, tackifiers and other additives can be added during the heating step and the material may subsequently be treated with radiation.

The solid PLA adhesive can be ground into particles and the particles used to coat substrates for bonding. Any grinder that can produce a relatively uniformly ground particle or shape can be used. For example, centrifugal blade impact grinders or burr grinders can be used. A PLA adhesive rod can be ground in the centrifugal blade impact grinder to obtain a powders having an average particle diameter in the range of about 200 to 1,000 microns and more preferably about 500 microns. The rods can also be ground into flakes using a burr grinder.

DESCRIPTION OF FIGURES

FIG. 1 shows how PLA properties are modified as a function of irradiation.

FIG. 2 shows how PLA properties are affected by TAIC crosslinker concentrations and radiation when PLA+TAIC is mixed in a plastomill (20 rpm at 180 C for 1 min) then pressed into 0.1 mm sheets at 150 kgf/cm$^2$; with An e-beam of 2 mEv and a dose rate of 10 kGy/pass. Gel fraction is mass of dried insoluble part after extraction with chloroform/initial mass. FIG. 2A shows the effect of PFM on crosslinking of PLA by irradiation. FIG. 2B shows the concentration effect of TAIC on crosslinking of PLA by irradiation. FIG. 2C shows thermomechanical properties (deformation %) of unirradiated pure PLA and 50 50 kGy irradiated PLA with 3% TAIC.

FIG. 6 provides a graph of tensile strength for each sample described in Example 3.

FIG. 13 illustrates an extruding device for high volume glue stick production.

FIG. 14 illustrates an apparatus and method for heat based PLA application.

FIG. 15 illustrates an oven apparatus and method for heat based joining of substrates.

FIG. 16 illustrates the geometry of a substrate gluing pattern as set forth in ASTM D906.

DETAILED DESCRIPTION

Figure 1A:
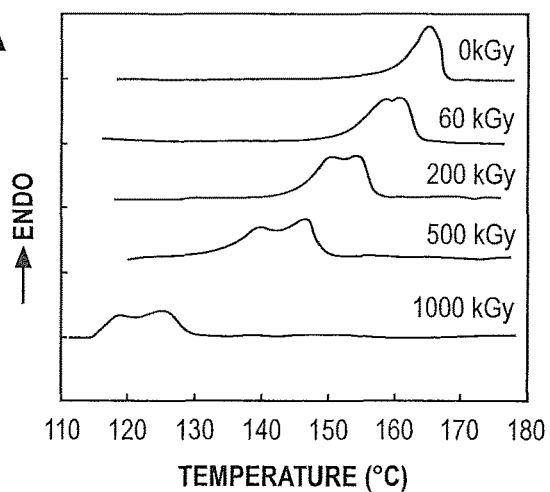
FIG. 1A shows the DSC heating curves of PLA samples irradiated in air at various radiation doses.
Figure 1B:
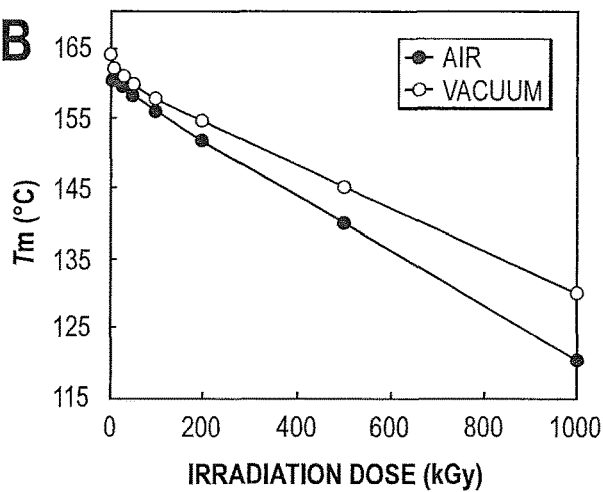
FIG. 1B provides a plot of the melting point Tm of PLA samples irradiated in air and in a vacuum against radiation dosage.
Figure 1C:
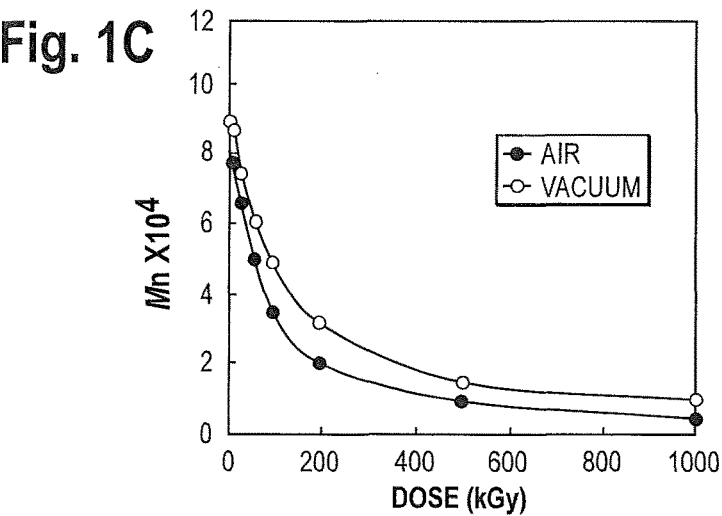
FIG. 1C shows the number average molecular weight Mn of PLA samples irradiated in air and in vacuum as a function of radiation dose.
Figure 1D:
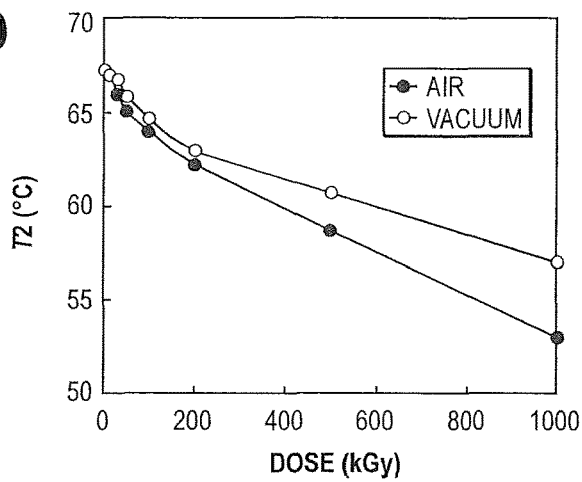
FIG. 1D shows the glass transition temperatures T2 of PLA samples irradiated in air and in vacuum as a function of radiation dose.
Figure 1E:
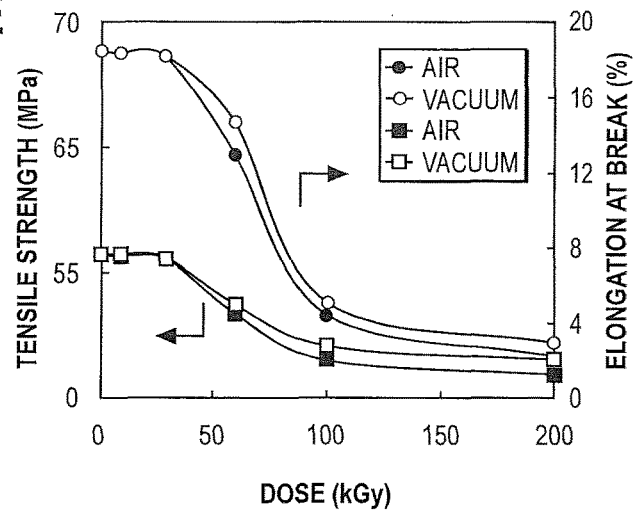
FIG. 1E shows the tensile strength and elongation at breaks of PLA samples irradiated in air and in vacuum as a function of radiation dose, respectively.
Figure 1F:
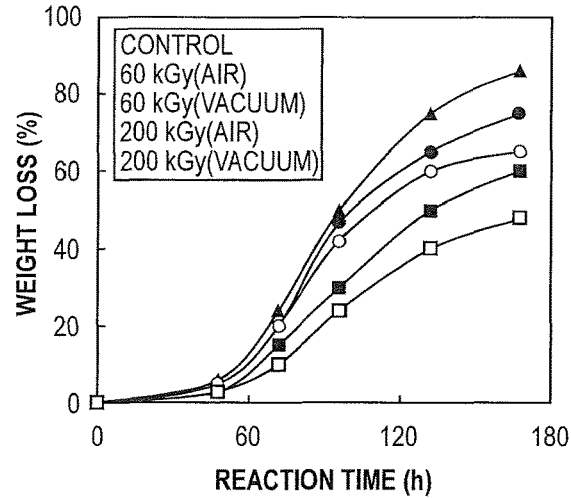
FIG. 1F shows the weight loss % of PLA samples irradiated in air and in vacuum as a function of radiation dose.

Novel PLA-based adhesives are disclosed that offer a range of advantages and benefits over known adhesives on the market, including tailored bonding characteristics. The disclosed adhesives do not require curing and allow full functionality and use of the bonded materials within seconds to minutes after application. They can be used with existing applicators, including hot-glue guns. Rates of glue dispensation and bonding strength can be easily customized for specific circumstances. The adhesives can be used in environments ranging from sub-freezing to over 200° C. They can be used to join a wide range of substrates with minimal or no need for surface preparations or the use of pressurization. Substrates that can be joined include plastics including teflon, glass, ceramics, metals including iron, copper, aluminum and their alloys, natural and engineered woods, brick, cinder block, stone, and marble among other materials. The adhesives can also be used to seal holes in containers and in between materials. Bonding strengths of the adhesives have remained stable over the entire length of observation used to date on the scale of months to years.

The adhesives also are generally free of volatile organic compounds (VOCs), use sustainable starting materials, are biodegradable and are no more expensive to use than conventional adhesives. For instances when a cross-linking agent such as TAIC is used during thermal processing, the portion by weight is preferably maintained at or below about 5 wt. % so that the adhesive product remains largely "green" and biodegradable.

Methods for preparing the adhesives in conventional glue stick, bead, granular or powder formats and alternate techniques are disclosed, along with results of experimental studies comparing the adhesives with conventional hot glue sticks, known glues, and other known adhesives.

The disclosed adhesives include polylactic acid that is irradiated with gamma radiation, such as by a $Co^{60}$ source. Irradiation times are used that improve the characteristics of the adhesive materials. Generally, the dose of radiation is from about 5 kGy to about 200 kGy of gamma irradiation. Gamma photon based irradiation can be used to tailor the strength of the adhesive product.

Polylactic acid (PLA) is a rigid thermoplastic polymer that is found in semicrystalline or amorphous states. L(−) lactic acid (2-hydroxy propionic acid) is the natural and most common form, but D(+) lactic acid can also be produced by use of microorganisms or racemization. PLA is a unique polymer that in many ways behaves like polyethylene terephthalate (PET) or polyethelene (PE) with potential for broad range of applications but historically, has been limited due to high production costs.

PLA can be prepared by both direct condensation of lactic acid and by the ring opening polymerization of the cyclic lactide as is known. The direct condensation technique leaves trace quantities of water and limits the degree of polymerization and therefore the potential molecular weight (MW). As a result the ring polymerization route is often used and has been preferred.

A low-cost production process can be used to prepare PLA. The process starts with lactic acid produced from fermentation of dextrose followed by continuous condensation to produce a low MW polymer. This material can be converted into a mixture of lactide stereoisomers using a catalyst and the lactide mixture is then purified by vacuum distillation. The finished PLA polymer can be produced using a tin organo catalyst without use of harmful solvents. Any remaining monomer can then be recovered and recycled. Various grades of PLA can be produced ranging from technical grade, edible grade, pharmaceutical grade, and analytical grade. The lowest grades contain sulfates, metals, amino acids and various carbohydrates. Inclusion of traces (ppm) of carbohydrates, amino acids and cations like Na+ can lead to racemization and the less desired D(+) lactic acid. Nevertheless, PLA production embraces the well known principles of green chemistry by: (1) preventing pollution at the source through use of a natural fermentation process to produce lactic acid; (2) substituting annually renewable materials for petroleum-based feedstock; (3) eliminating the use of solvents or other hazardous materials; (4) completely recycling product and by-product streams, and, (5) efficient use of catalysts to reduce energy consumption and improve yield. In addition, by products can either be recycled or composted after use.

PLA has been produced using up to 50% less fossil fuel than conventional plastic resins. PLA is also a low-impact, greenhouse gas polymer because the CO2 generated during PLA biodegradation is balanced by an equal amount taken from the atmosphere during the growth of the plant feedstocks. Greenhouse gas emission rates for PLA versus that for nylon are about 1,600 kg $CO_2$/metric ton and about 7,150 kg $CO_2$/metric ton, respectively. In terms of energy usage, nylon polymers require about 142 MJ/kg as compared to only about 34 MJ/kg for PLA.

In terms of physical properties two temperatures are usually considered important: Tg (the glass transition temperature) and Tm (the melting temperature) for most commercial applications (e.g., cups, holders, etc.). In the solid state, PLA can be amorphous or semi-crystalline. For amorphous PLA, Tg determines the upper use temperature. For semi-crystalline PLA, both the Tg (about 60° C.) and Tm (about 130-230° C.) are determinants for use. At temperatures above the Tg amorphous PLA transition occurs from glass to rubbery states. This is undesirable because the final PLA material will behave as a viscous fluid upon further heating. Below Tg, PLA behaves like a glass with the ability to creep until about −45° C. below which it behaves as a brittle polymer. The density of PLA in liquid states can be derived from the expression $\rho$ (g/cc)=$\rho 150°$ C./$(1+\alpha(T-150))$, where, $\alpha$=thermal expansion coefficient=$7.4 \times 10^{-4}$ C−1 and $\rho(150°$ C.) about 1.14 g/cc; solid PLA has a density of about 1.25 g/cc and the purely crystalline PLA density is about 1.49 g/cc. The heat of fusion is estimated to be about 93 kJ/kg. At room temperature the bulk modulus (E) is about $1-3 \times 10^9$ Pa, which drops sharply between 55 to 80° C. decreasing to $1-3 \times 10^6$ Pa. PLA is characterized as:

$(C_3H_4O_2)N$ and has a hazard rating of 1 for fire which occurs only above 93° C., and 0 for health, reactivity and other categories. The specific heat capacity (Cp) can be evaluated from the equation Cp (J/mol)=120+0.076 T, which, at T=400K is about 2 kJ/kg (compared with about 4.2 kJ/kg for water).

Under conditions of high temperature and high relative humidity (RH) (e.g., active compost) PLA degrades quickly and disintegrates within weeks to months. The primary mechanism for degradation is hydrolysis followed by bacterial attack in a two-stage process. This is accelerated by the presence of acids or bases and is dependent on moisture content and temperature. Below Tg, the rate of degradation is low and PLA can retain its properties for several years, but above Tg, it accelerates rapidly in the presence of high humidity within a matter of months. The fidelity of the PLA depends on avoidance of significant chain scission and MW reduction. FIG. 1 shows this relationship. As noted therein, above Tg, the variation of MW with time is negligible even in 80% RH. These properties can make the disclosed PLA adhesive a useful product for end of life breakdown of adhered substrates. Such degradation can, however, be modified through the use of cross-linking enhanced BY irradiation as is discussed herein and in FIG. 5.

Table 2 shows certain characteristics of PLA materials.

TABLE 2

Properties of extrusion/thermoforming and injection molding grades of PLA

| Item | PLA Polymer 2000Da | ASTM Method | PLA Polymer 3010Db | ASTM Method |
|---|---|---|---|---|
| Physical Property | | | | |
| Specific gravity (g/cc) | 1.25 | D792 | 1.21 | D792 |
| Melt index, g/10 min. (190 C./2.16 kg) | 4-8 | D1238 | 10-30 | D1238 |
| Clarity | Transparent | | Transparent | |
| Mechanical Properties | | | | |
| Tensile strength at break psi (MPa) | 7,700 (53) | D882 | 7,000 (48) | D638 |
| Tensile yield strength, psi (MPa) | 8,700 (60) | D882 | | |
| Tensile modulus, kpsi (GPa) | 500 (3.5) | D882 | | |
| Tensile elongation (%) | 6 | D882 | | | a2000D is a product of Cargill Dow, LLC designed as an extrusion/thermoforming grade; properties typical of extruded sheet.
b3010D is a product of Cargill Dow, LLC designed as an injection molding grade; properties typical of injection molded tensile bars.

As noted in the table (above), as compared with conventional adhesives with strengths of up to only about 14 MPa (2,000 psi), the tensile strength of PLA polymers have been recorded to be as high as about 53-60 MPa (about 8,000 psi) or about 400% greater. However, this value represents only the cohesive tensile strength of the polymer itself at 20° C.; the actual bond strength of a PLA-adhesive joined system also depends on the adhesion strength of the PLA when in contact with the substrate surface and depends on the substrate itself.

Polymer properties may be modified via either chain scission or via cross-linking. Ionizing radiation that has been studied for the large part utilized gamma photons (e.g., from a $^{60}$Co irradiator) or other suitable gamma electron and neutron radiation sources can be used. Numerous other strong (MeV range) gamma-beta ray emitters can also be used. For example, $^{137}$Cs, $^{32}$P among others which produce radiation in the MeV range such that significant electron radiation takes place primarily by Compton scattering and pair-production and the photo-electric effect (which starts to dominate at lower than about 0.1 MeV gamma energies). In addition, electron beams that can create reactive ion pairs that can cause crosslinking of individual molecules to produce polymers can also be used. This is similar to use of neutrons, preferably in the fast (MeV) energy range so as to minimize residual activation products.

FIG. 1 depicts the key property variations of PLA with radiation dose measured in MGy. The data of FIG. 1 were obtained for higher dose levels and demonstrate the possibility of extending the use of the disclosed adhesives in areas involving higher radiation fields, e.g., as encountered in nuclear power systems, spent nuclear fuel reprocessing and/or storage plants, as well as, for areas such as food irradiation facilities where the collective dose may grow over time. FIG. 1 demonstrates that enhanced radiation doses give rise to lower of melting temperatures, falling from about 170° C. at 0 kGy to about 165° C. at 60 kGy to 120° C. (at 1,000 kGy). Over the same range of radiation dosage the MW can degrade significantly by over 90% indicating that the strength of PLA will come down significantly. This relationship offers an opportunity for on-demand tailoring for the desired strength of an adhesive. Tg and tensile strength variation is also reduced with increasing dose but, generally doses below 50 MGy will be used and under these circumstances the reduction in Tg is minimal (i.e., by only about 5 C). This means that hydrolysis based degradation of PLA adhesives should not become an issue as long as the subsequent operating temperatures for use of PLA-bonded materials are kept below the Tg. Tensile strength variations below about 50 kGy are also modest. With neutron-based irradiation for doses for up to 20 MRad (200 kGy) no significant degradation of PLA properties is observed.

In one adhesive application irradiation reduced PLA bond strength with substrates can be used as a switch to cause disengaging of the adhesive bond such as in a joint. This can occur passively without need for energizing equipment and could be used for example, to signal stress conditions such as critical radiation dose threshold induced stress conditions that are unsafe.

One common way to enhance properties of polymers has been the use of crosslinking (either using chemical or irradiation means) to increase the molecular weight, tensile strength, abrasion resistance, improved crush/flame resistance and thermal stability. Compared with chemical techniques, such as vulcanization of rubber tires, irradiation-induced cross-linking offers unique potential benefits, including: (1) no lower limit of physical size of the joined specimens so that smaller conductor sizes and thin insulation walls can be used; (2) no need for use of high temperatures or pressure so that separator tapes are not required to prevent thin wall insulations from being forced into the conductor stand surface; and, (3) freedom to include small quantities of additives without worrying about issues such as explosions or fires. In this regard, the influence of using small amounts, such as about 3 wt. % o, of a cross-linking agent, triallyl isocynaurate (TAIC) has been studied on PLA together with irradiation.

In addition to TAIC other crosslinking agents can also be used. For example, TMAIC (Trimethylallyl isocyanurate); TMPTA (Trimethylolpropane trimethacylate); HDDA (1,6-Hexanedisol diacrylate), PCL (polycaprolactone) and Joncryl AdzR-4368F. They are sold either as powders or liquids.

The crosslinkers can be used at concentrations that range from 0.1 to 5 wt. % or more preferably at about 3 or 4 wt. %.

Joncryl AdzR-4368F (an epoxy based agent sold by BASF) can be used in concentrations of from about 0.5 to 5 wt. % and more typically at about 1 wt. % by mechanically mixing with PLA resin or powder.

PCL (polycaprolactone) can be used in resin form for cross-linking with PLA to help improve properties such as strain to failure of sheets.

Crosslinkers can be mixed with PLA in conventional ways so as to achieve a relatively homogeneous mixture. Generally, the PLA is first mixed mechanically with the crosslinker. For example, PLA powder can be mixed with liquid TAIC in the desired proportion and mechanically mixed using any conventional method. The mixture can be melted and the melted mixture can be molded into any desired shape such as a glue stick. The glue stick can then be placed in an irradiator for irradiation.

Alternatively, PLA resin beads can be soaked in a liquid containing a crosslinker for a sufficient period of time to allow ingress of TAIC into the PLA resin. Soaking can be overnight or for about 6-8 h at about 80-100° C. The crosslinker soaked PLA resin can be directly melted and cast prior to placement into the irradiator.

FIG. 2 shows how certain properties vary with irradiation. PLA can be irradiated using an electron beam in the presence of polyfunctional monomers as crosslinking agents. The crosslinked PLA has heat resistance higher than 200° C.

As can be seen, strength is enhanced (close to 80% increase in gel fraction) with elevated temperatures of PLA. Without irradiation (TAIC-catalyzed cross-linking) the PLA lost strength at and above about 70° C. (deforming by over 80%). In contrast, with a modest 50 kGy of gamma photon dose and 3 wt. % TAIC the PLA retains strength without degradation even at temperatures as high as 200° C. without any significant deformation. This allows for tailoring the PLA based adhesive such that it may retain high strength and functionality in high temperature environments.

Various properties of the PLA material itself can be varied with irradiation. Surprisingly, these properties are also manifested when the actual adhesive formulation is made and dispensed onto a variety of substrates to provide desired bond strengths. The combination of manufacturing parameters that provide the combination of viscosity and melting temperature have been determined empirically with various irradiated PLA-TAIC-Plasticizer combinations. This can be important because unless the adhesive is in a liquid state it is not amenable to use for joining. For PLA adhesives having about 5 wt. % TAIC that are irradiated with over 20 kGy the melting temperature rises to over 200° C. In such cases, it can be advantageous to perform the irradiation after the adhesive is dispensed onto substrates.

FIG. 2 shows that crosslinking of the PLA enhances strength, molecular weight and resistance to degradation at high temperatures. From an environmental viewpoint, the addition of TAIC exhibits overall properties similar to PLA based on the hazard ratings of 1(Fire), 1(health), and 0 for reactivity and other categories.

PLA source material can be obtained from any commercial source including NatureWorks, LLC (as resin beads [about 0.038 g (0.093 cc)/bead or as a powder; from Makerbot, Inc. (as rod shaped 3 mm thick strand spools made from NatureWorks 4043D resin as feedstock); from Cleam-Lam, Packaging, Inc. (as a 20-30 mil sheets); and from Bi-Ax, Inc. (as a 40 μm thick film).

Crosslinkers such as TAIC can be procured from commercial vendors and can be used in liquid form at room temperature. It can be added to molten PLA while mixing using a stirrer. Irradiation can be conducted, for example, with a $^{60}Co$ gamma irradiator capable of providing about 5 Gy/min. of radiation dose or an industrial scale (gamma and e-beam) facility such as is used for food processing and sterilization to economically provide MRad (10 kGy) level doses to processed items.

To determine joining/bonding characteristics of adhesive two forms of substrates were employed, including: (1) a pine cassette pair having 0.25"×1.75"×3.75" dimensions; and, (2) a stainless steel, carbon steel, and aluminum in cylindrical dowel form having 0.25"±0.0001" diameter. Testing for bonding strength was conducted using an ASTM-standardized tester, such as an INSTRON 5566 ATM using the programmed setting for loading per % strain. The substrates to be tested were adapted for testing in the INSTRON tester so as to minimize misalignment related issues. Aluminum and steel T-bar forms were also included in the testing program for which no special adaptation was necessary.

For assessing relative performance strength of joined specimens of wood or metal, four conventional, widely used adhesives were tested. These include: Gorilla Glue® (two forms), Loctite® brand super-glue, and conventional hot-gun glue sticks from AdTech®.

Three designs and approaches were used for preparing melting of PLA feedstock prior to entering into a mold for casting of adhesive glue-sticks. In all three methods, the PLA feedstock is melted and maintained at the melting temperature for a set period of time. The melting temperature for optimal results ranges from about 240° C. to about 260° C., whereas, the time duration ranges from about 20 min. to over 80 min. The time duration at temperature determines the degree of chemical reactions within the molten PLA, which, affects two key properties associated with joining substrates: (1) the delivery rate, which is a function of viscosity, when dispensed from conventional hot glue guns, and (2) the bond strength attainable. Surprisingly, it was observed that the shorter the time of melting at temperature prior to casting, the slower was the delivery rate (and working times) possible from conventional hot glue guns, and the lower the bond strength. It was found that the resulting color of the cast adhesive glue stick also varies with time at temperature and directly affects delivery rate, working time and bond strength. Darker coloration resulted from longer cook time at temperature and resulted in a greater reduction in viscosity, melt temperature, and also reduced the energy required to melt the adhesive. Therefore, the adhesive glue stick color provides a method for tayloring subsequent adhesive performance characteristics.

The first approach utilized a shallow metal foil tray in which PLA feedstock was placed. Thereafter, the tray was placed within a temperature-controlled oven to melt the PLA for a certain desired amount of time at a desired temperature. The second approach utilized a clam-shell electrically powered radiant heater which heated an oil-filled beaker (400 mL Kimax® tall form) with a test tube bearing PLA feedstock. A thermocouple dipped into the oil bath monitored the temperature and feeds signals to the clam-shell heater to turn it on or off to ensure a constant temperature is maintained. The oil can be any low vapor pressure oil with high smoke points such as, olive oil, almond oil (430° F.); avocado oil (520° F.); canola oil (435° F.); corn oil-refined (450° F.); grapeseed oil (485° F.); peanut oil-refined (450° F.); rapeseed oil (438 F); safflower oil-refined (450-510° F.); sesame oil-semi refined (450 F); soy oil refined (495 F); high olefic sunflower oil-refined (450° F.).

The third approach is similar to the second approach, except that a significantly larger (1 L) oil-filled beaker allowing up to 4 simultaneous 1 inch diameter test tubes with PLA feedstock is enclosed in a metal foil covered secondary metal container for safety and minimizing heat loss. The secondary container is placed on to the resistance (electrical) heater element of a conventional store bought stovetop heater by Frigidaire®. A thermocouple within the oil bath is used in conjunction with a thermostat switch to control the on-off switching of the electrical heater element. Both of these can be controlled by a LabView™ based virtual instrument panel on a computer. The larger system embodying greater thermal inertia and better insulation allows for more uniform and consistent temperatures and allows for faster heating of the PLA-bearing feedstock (with or without TAIC). About 30 minutes from start for melting at 270° C. is the approximate time required for start of casting to attain a reference color (e.g., the bond strength attained with 70 min. of melt at 240° C.).

A method is also disclosed for molding molten PLA. The method uses a cylinder which can be a metal cylinder such as aluminum which is open at both ends. The bottom end is closed with a cap while pouring. Prior to casting the aluminum casting cylinder is dipped into an oil bath so as to coat the inside surface with a suitable material which aids to avoid the adhesive glue mix from sticking with the casting mold. The inside diameter of the mold is the desired outer diameter of the cast adhesive glue stick, which in this case was about 11.2 mm (0.44"). Larger diameter slugs (e.g., in the 2" range) as for spray guns have also been produced. Various length molds are possible and can range from 10 cm (4") to about 25 cm (10"), for example. The aluminum tube was preheated for about 5 minutes in the oil bath prior removal and start of casting. Once the molten PLA mix is poured into the mold (affixed with a ring stand and the bottom closed off by resting the open end on a metal sheet) the melt will start to cool and freeze. The melt should not be allowed to freeze in order to prevent the adhesive glue from getting bonded to the metal mold surface. Once the temperature as measured by a thermocouple has reached close to the glass transition temperature of about Tg (about 70° C.), while the material is yet pliable it can be dislodged from the tube mold (to avoid fouling). The molded adhesive can be removed from the mold by tapping with a punch from one end of the tube. Generally, if the punch deforms the adhesive glue instead of moving it forward as a whole, it is not yet ready for pushing out. However, if the cast starts to move, more force is then applied to push the cylindrical stick out of the mold. The aluminum cylinder can be replaced with one made of teflon. In this instance there is no need to dipping the tube in oil to avoid sticking of the adhesive.

In certain methods a final step of resurfacing the cast adhesive glue stick is used so that the glue stick can be adapted for use in commercially available hot glue guns. Some hot glue guns require the glue sticks to have a tacky surface for trigger-operated motion. The cast adhesive glue stick surface is smooth and thus, in such cases the glue stick requires an additional step such that the surface can "catch" to the grips of these hot glue guns. Any sheet can be used that avoids operational problems like separation/bunching during dispensing. Grooves can be cut into the surface for example by positioning the glue stick in the chuck of a drill press and circumferential groove marks (about 0.1 mm+) can be introduced at 1-2 mm intervals, for example, using a utility knife blade or some sharp object as the glue stick is rotated.

The cast adhesive glue sticks will embody varying shades of brown depending on how long they have been subject to thermal treatment. The higher the time at temperature, the deeper the brown coloring, Marked differences are visibly apparent between a glue stick heated for 20 minutes versus 70 minutes at melt temperatures of 240° C. A color chart to compare glue sticks was developed for direct comparison. However, a spectrophotometer can also be to accurately measure the color of the product. A detector set to detect a 337 nm (UV) laser beam can be used. The glue stick can be placed in front of the detector and the resultant beam intensity can be monitored using a CdS photoresistor. Deeper color attenuates the light beam which can be monitored in the detector. Alternatively a spectrophotometer (using a 546.1 nm wavelength) can be used.

The adhesive can be molded such that conventional dispensing devices including glue guns can be used. Glue sticks can be prepared for use in most if not all glue guns currently in commercial use. Certain versions require the use of adhesive glue sticks with grooves.

Alternatively, a Wagner HT1000® hot air gun (1.2 kW) can be used to provide a heat source for application purposes, for example to join steel dowels. The steel dowels to be joined can be placed with about 2-3 mm gap within an L-aluminum bracket over a U-channel support positioned over bars of $Ca_2SiO_4$ (which served as thermal insulation) held within a vise. The L-bracket can be covered with Aluminum foil (15 micron) to prevent excess glue from sticking to the L-bracket. A thermocouple ($\frac{1}{16}$" diameter, 0.3 s response time from Omega®) can be placed within the ¼" diameter steel dowels to monitor for temperature if needed. The Wagner HT1000® was positioned with its nozzle about 4.5" from the metal dowels. With the HT1000® hot air gun on, the thermocouple temperature was read until about 260° C. was reached after which 3 PLA resin beads total mass about 0.115 g (each of about 0.038 g occupying about 0.09 cc volume in total) were dispensed over the gap between the two dowels. The material to be applied should be sufficient to provide a joint of a desired thickness. Assuming the entire 0.093 cc volume is taken up to cover only the circular area of each dowel, the thickness was about 0.03 mm or 30 microns. Once applied, the beads melt and fill up the gap between the dowels and the HT1000® is turned off (to avoid blowing away the beads/melt). If radiant heating source (e.g., a radiant lamp or an oven) were used as heat source, t the heater may not be necessary. Upon bead application and melting the two steel dowels can be pressed together. The heater can be used to reheat the joint to a desired temperature prior to cooling. A similar method can also be used to join the metallic T-bars.

A fixture designed to hold substrates in cassette form can be used so as to align thin sheets, such as glass, plastic, and/or metal sheets, for proper joining. This minimized interference from bending or peeling. As for joining metal dowels, the jig can be lined first with aluminum foil before placing the cassettes on to the jig. The foil can be peeled off from the joined substrates. The jig can be placed at an angle for convenience. After application of the adhesive glue to the lower cassette the upper cassette is pressed down under the weight. Any prescribed pressing force can be used to provide the desired thickness of adhesive between the joined substrates.

The following substances can be joined by the disclosed adhesives and methods using the described methods: Bamboo butcher block (from Terragren) coated in PLA adhesive, plywood, tempered hardboard, engineered woods, marble slab, PTFE, cardboard; glass; cloth; leather, canvas, steel, aluminum, and vinyl among other substrates.

Example 1

This example demonstrates how the rate of adhesive dispensing varies with the time of heating of the adhesive.

For direct comparison of throughput for cast adhesive glue sticks of various types, commercially available hot glue gun sticks from Adhesives Technology, Inc. were utilized. The hot glue gun PRO200® was utilized for dispensing various grades of adhesive glues and also the Adhesives Tech. glue sticks. The time in parenthesis below indicates the amount of time the adhesive was held at the temperature of the glue gun before dispensing. Results are summarized below in Table 3. The viscosity of the Adhesives Tech. glue at 350° F. application temperature is stated by the manufacturer to be in the range of about 12,000 cps.

TABLE 3

Rates of glue dispensation from PRO200 ® Glue Gun

| Glue Type | Rate of dispensation from PRO200 ® glue gun (g/min) |
| --- | --- |
| Adhesives Tech. hot glue gun stick | 30.12 |
| adhesive (direct resin in gun for 20 min) | 13.5 |
| adhesive (glue stick, 20 min at about 250° C.) | 29.87 |
| adhesive (glue stick, 30 min at about 250° C.) | 34.16 |
| adhesive (glue stick, 40 min at about 250° C.) | 38.72 |
| adhesive (glue stick, 50 min at about 250° C.) | 45.02 |
| adhesive (glue stick, 60 min at about 250° C.) | 51.48 |

As can be seen in the Table above the rate of adhesive glue dispensing can be tailored to be at or above the rate obtained from Adhesive Tech glue sticks by as much as 71%.

This example demonstrates that by following the disclosed raw PLA resin thermal processing method PLA adhesives can be produced in the viscosity range of from about 70% below to about 50% above that of conventional hot glue sticks (i.e., from a low of about 7,000 cps for the 60 min. treatment at 250° C., to about 12,000 cps for the 20 min. treatment at 250° C. adhesive, to about 18,000 cps for the direct resin in the hot glue gun for 20 min. Thus following the disclosed methods in the absence of plasticizer and cross-linking agent, the range of viscosity at the normal 350° F. application temperature can be varied over a wide range. Viscosity has been lowered even further by the addition of a plasticizer, such as Proviplast 25422, at about 12-15 wt. % to obtain reduced viscosity in the range of about 6,000 cps by maintaining the mixture of PLA resin and plasticizer at 250° C. for about 30 min. The viscosity can be reduced to about 1,500 cps or below for application in spray guns at about 200° C. The value of 6,000 cps (for PLA based adhesive with about 12 wt. % o Proviplast® biodegradable plasticizer is comparable to that for commercial VOC-containing hot glue stick adhesives such as from Surebonder® 702 and 727.

Example 2

This example demonstrates how the melting temperature of the disclosed adhesive varies as a function of resident heating time as measured by differential scanning calorimetry (DSC).

Figure 3:
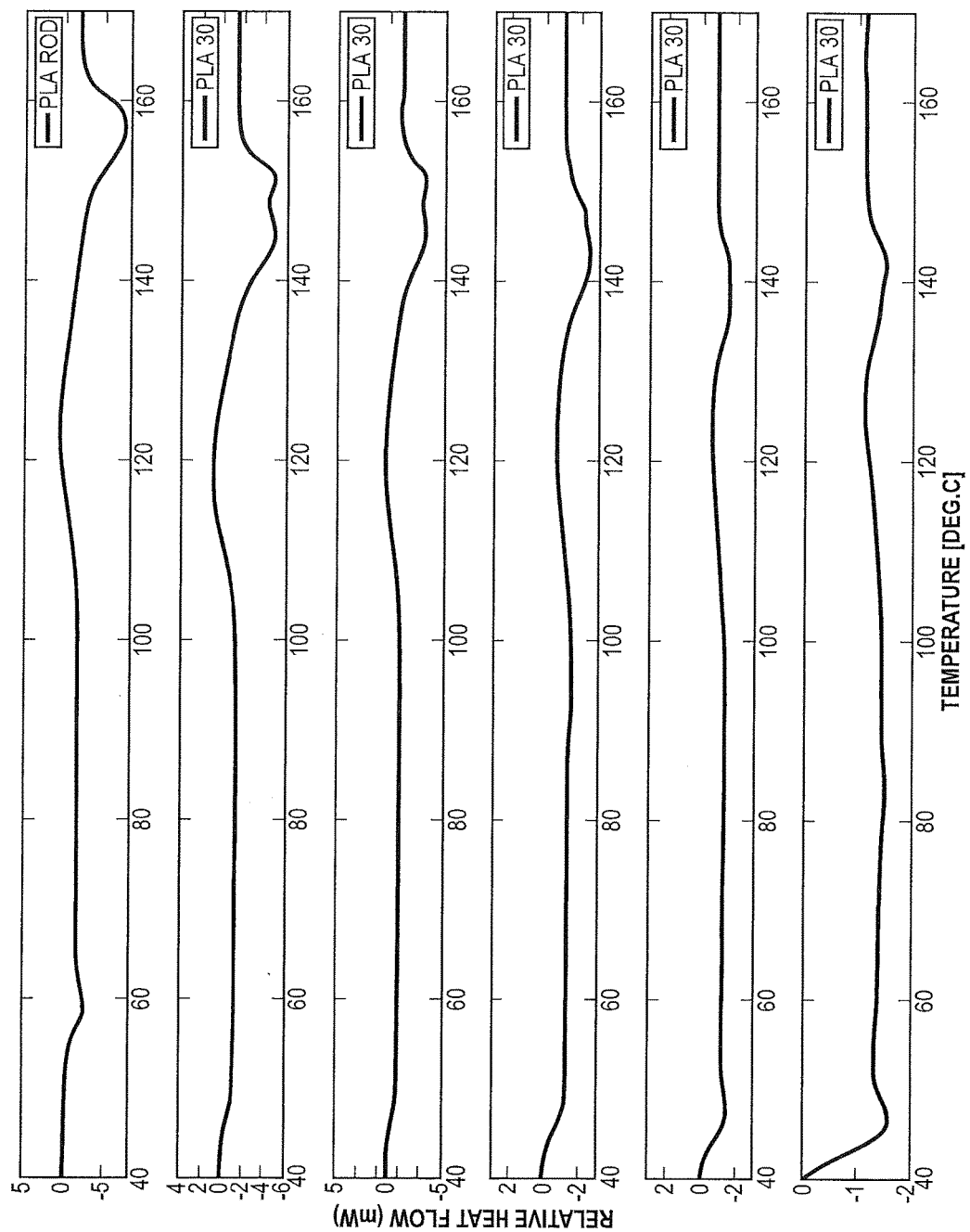
FIG. 3 shows differential scanning calorimetry data for PLA glue sticks.

About 10 mg of various grades of adhesive glues as used for deriving rates of dispensation in Table 3, were used in these experiments. DSC data were obtained as shown in FIG. 3 to assess for changes in melting temperature (Tm) and also for the degree of energy (power) required for melting. Table 4 summarizes the data obtained from DSC calorimetry. The melting temperature drops by about 20° C. after 60 minutes of heating of the adhesive glue when compared with commercial PLA and the differential power (or energy for melting) drops by close to an order of magnitude. For commercial PLA the amount of energy required was about 102 J/kg (close to the published value for heat of fusion). However, for the disclosed adhesive 70 minutes of heating led to a reduction by a factor of 10.

TABLE 4

Adhesive. Differential Scanning Calorimetry (DSC) with about 10 mg samples

| Glue type | Tm (° C.) | ΔQ (mW) |
| --- | --- | --- |
| Rod type PLA (from Makerbot, Inc.) | 157 | about 8 |
| adhesive (glue stick, 30 min at about 250° C.) | 148 | about 6 |
| adhesive (glue stick, 50 min at about 250° C.) | 143 | about 1.8 |
| adhesive (glue stick, 60 min at about 250° C.) | 40 | about 1 |
| adhesive (glue stick, 70 min at about 250° C.) | 142 | about 0.6 |

The temperature required for melting can be raised to just under 200° C. (such that the adhesive can be used in plywood veneer joining by treating the adhesive at about 250° C. for about 30 min. with the addition of about 5 wt. % o TAIC followed with photon irradiation at a dose of about 15 kGy. Higher doses beyond 20 kGy result in melting temperatures rising to levels such that the adhesive will start to fume and burn in air. Lower levels of TAIC or lower than 15 kGy irradiation will result in lower than 200° C. melting temperatures and reduced resistance to degradation in water. It is to be noted that the step of irradiation can be before or after the adhesive is applied. Performing the irradiation before the application results in enhancement of the melting temperature and lowering of viscosity even as it becomes more resistant to heat and water attack. However, increased viscosity and higher melting temperature also makes the adhesive more difficult to dispense and/or apply. When a PLA adhesive containing TAIC is irradiation with over 20 kGy and the melting temperature rises to above 200° C., it is preferable to perform the irradiation after application of the TAIC-containing adhesive. In this case, the joined substrates along with the adhesive can be irradiated.

Example 3

This example demonstrates the variation in tensile strength of joints in wood cassettes joined with adhesive which is dispensed from a standard hot glue gun. Results are provided for wood substrate that is not preheated and then for preheated wood.

Figure 4:
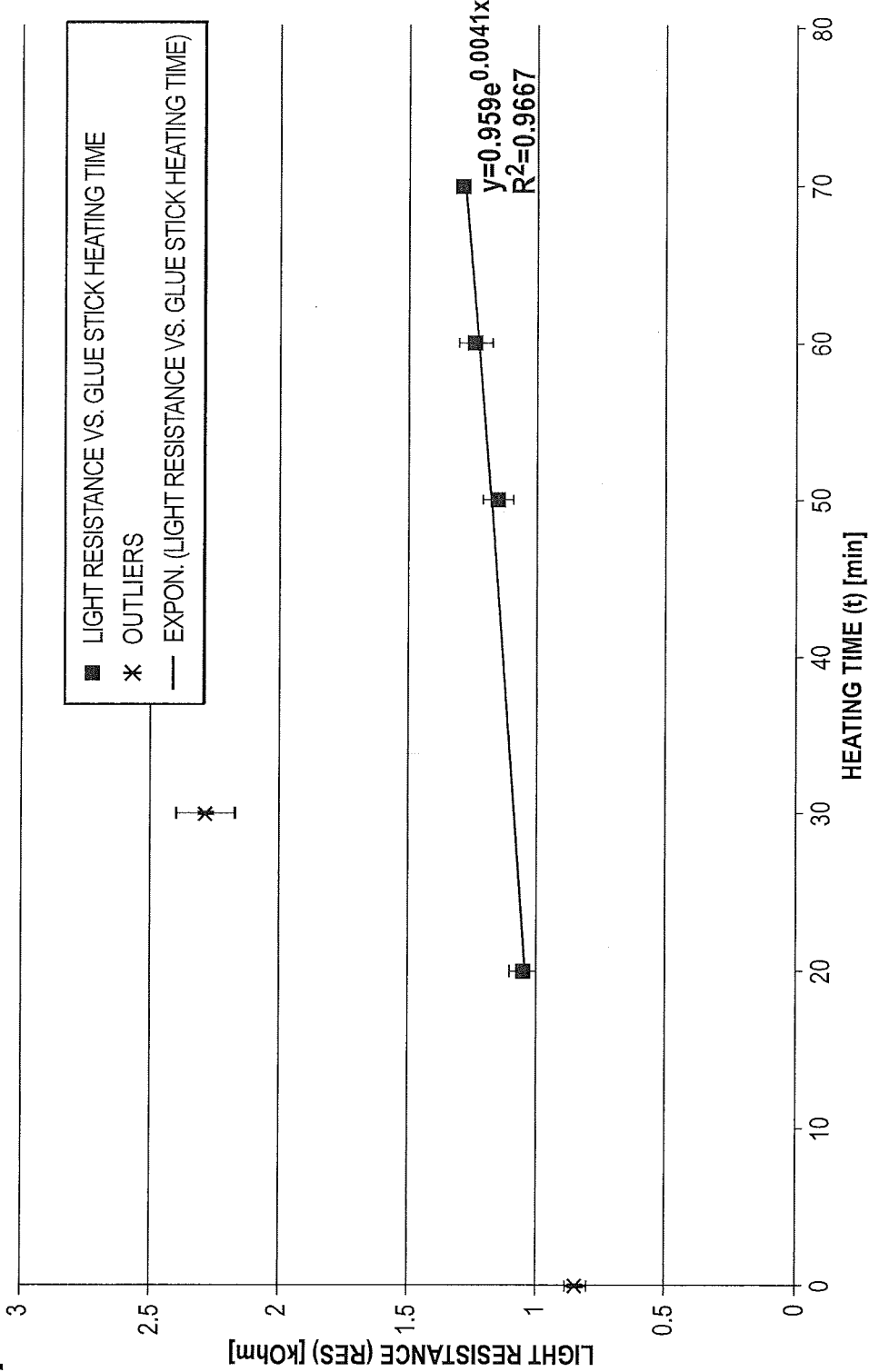
FIG. 4 provides a graph of the light resistance versus heating time at after heating at 240° C.
Figure 5A:
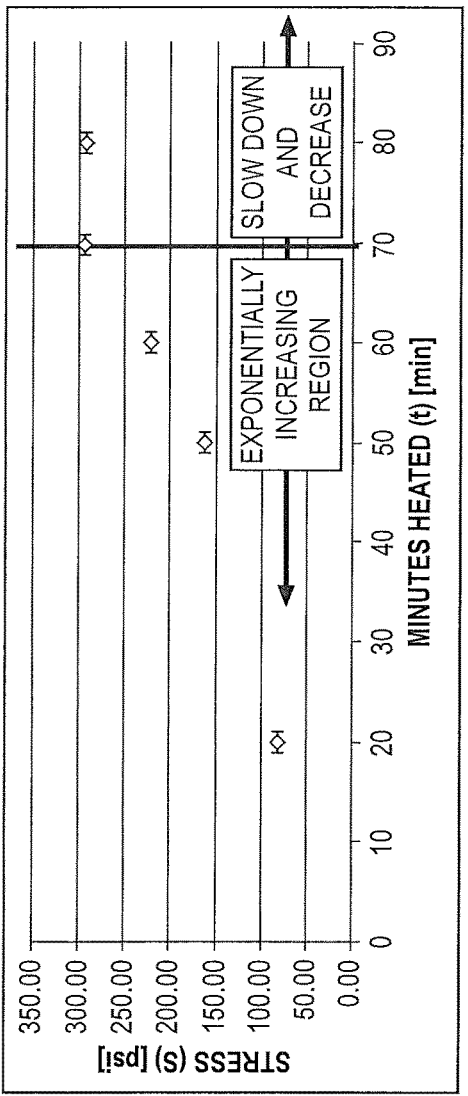
FIG. 5 provides graphs of tensile strength of glued wood cassettes as a function of heating time (FIG. 5A, upper graph) and resistance across photoresistor (FIG. 5B lower graph).
Figure 5B:
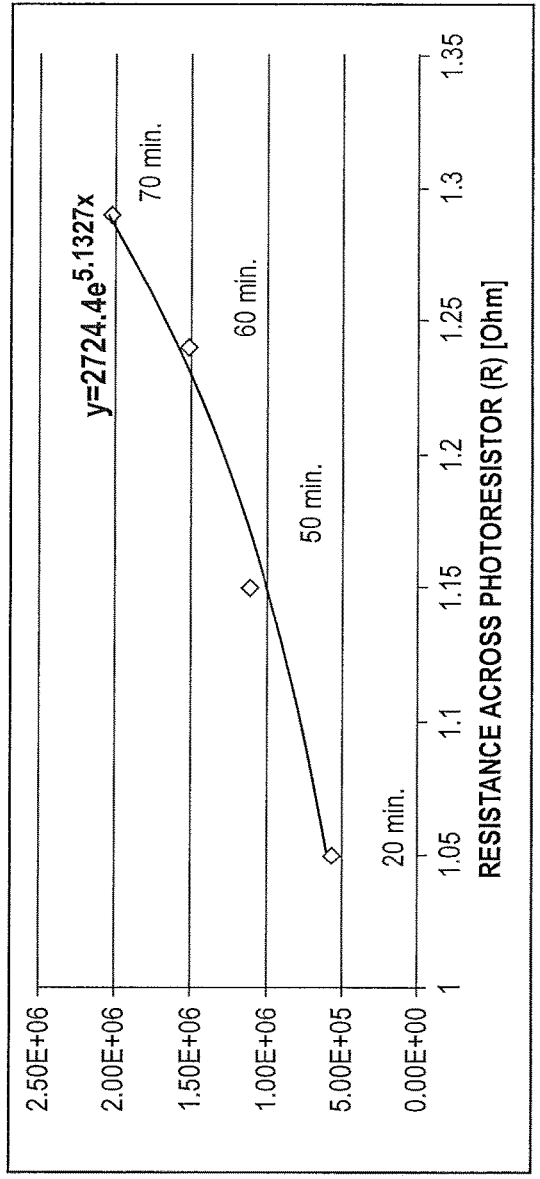

FIGS. 4 and 5 show light transmittance (as monitored by a photoresistor) and tensile strength from joined wood (without preheating), respectively with adhesive glue sticks prepared with various times at temperature (240° C.). In FIG. 4 the 30-min. adhesive glue stick photoresistance is an outlier caused by the presence of numerous bubbles within the particular glue stick, which are normally avoided. As noted from FIG. 5, the bond strength increases at first from about 500 kPa (80 psi) when using 20-min. adhesive glue sticks to about 2 MPa (about 300 psi) when using 70-min. adhesive glue sticks. Thereafter, the bond strength does not increase with further time at temperature of 240° C. Also shown is the result of photoresistance change for each adhesive glue stick: about 1.05 ohms for 20-min. adhesive glue stick to about 1.3 ohms for the 70-min. adhesive glue stick. A spectrophotometer was used to measure the relative transmittance and absorbance of 20-min. and 60-min. heating of PLA glue sticks. Results are tabulated below in Table 5:

TABLE 5 adhesive glue characterization of discoloration via optical transmission

| Parameter | PLA stick (20 min; 255° C.) | PLA stick (60 min., 255° C.) |
|---|---|---|
| Avg. transmittance* | 12.075% | 6.275% |
| Avg. absorbance* | 0.934 | 1.219 |

*the values were obtained as an average of 4 readings taken for the same glue stick rotated 90 degrees each time.

These results show that bond-strength performance can be assessed using any of the above mentioned three measurements.

FIG. 6 shows the surprising result that the longer the residence time at temperature under hot (about 200° C.) conditions, the higher is the resulting bond strength. For these particular batches of individual wood dowel samples consisting of up to 6 samples each from a particular batch of adhesive glue stick, the extra residence time within the glue gun for the last sample versus the first amounted to an extra 20 min. and gave rise to enhanced bond strength. It is noted that because of the application method for each sample, the glue stick adhesive is subjected to more heat than simply the oil bath heating time. The samples created at the end of a set have up to 20 minutes more heating time while in the glue gun than the samples created at the beginning of a set.

Figure 7:
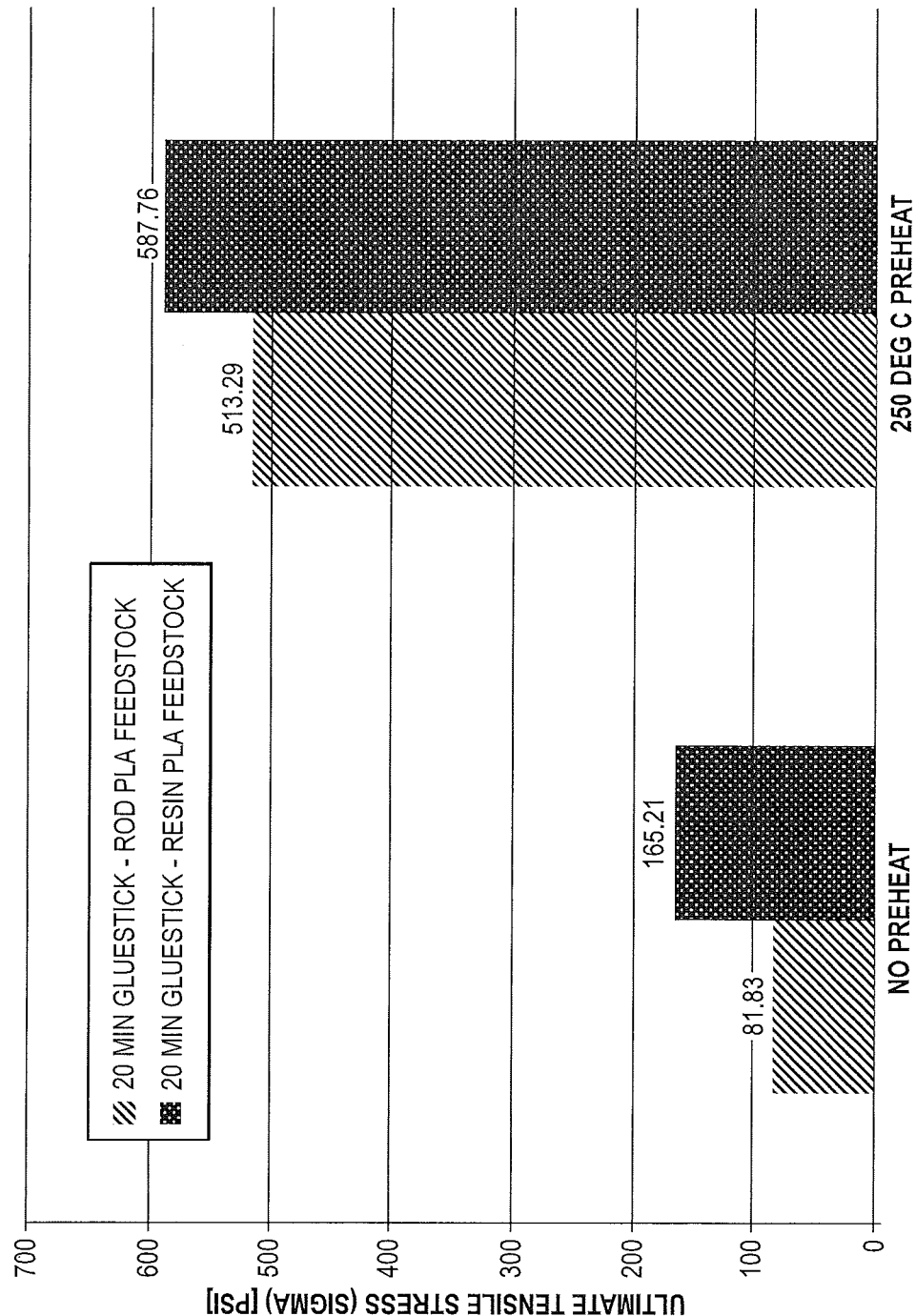
FIG. 7 provides the tensile strengths of joined wood cassettes with preheating for samples described in Example 3.

FIG. 7 shows the dramatic impact of wood substrate preheating prior to adhesive application. This sample of results is presented for 20-min. adhesive glue prepared from two varieties of PLA stock, rod and raw resin form. The use of rod form PLA stock provides consistently reduced bond strength by about 50% (without preheating) and by about 10% (with preheating). However, the very act of preheating to about 250° C. prior to adhesive glue application raised the bond strength: (a) when using PLA rod feedstock—from about 81 psi without preheating to over 510 psi with preheating, or by over 600%; and (b) when using PLA resin feedstock—from about 165 psi (without preheating) to about 587 psi with preheating, or by about 360%.

Figure 8:
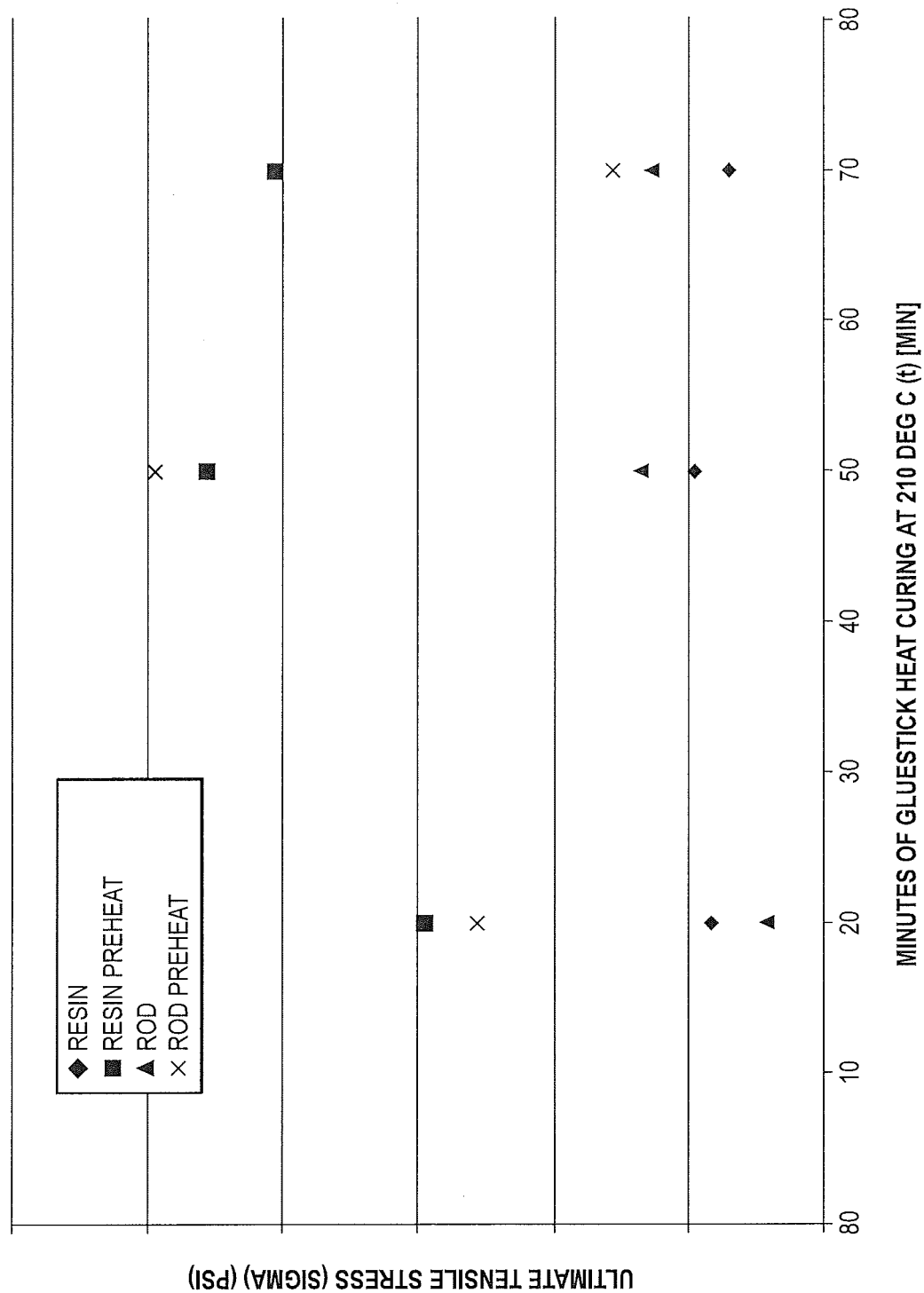
FIG. 8 provides the tensile strengths of joined wood cassettes versus glue stick heat curing at 240° C. as described in Example 3.

FIG. 8 depicts overall results for bond strength with adhesive glue formed for increased times at temperature. As noted, with enhanced time at temperature from 20 min to 50 min., the bond strengths attainable can be increased to become close to 1,000 psi.

Example 4

This example shows that bond strength of the disclosed adhesive glue when applied to steel dowels can be controlled by the method of application.

Figure 9:
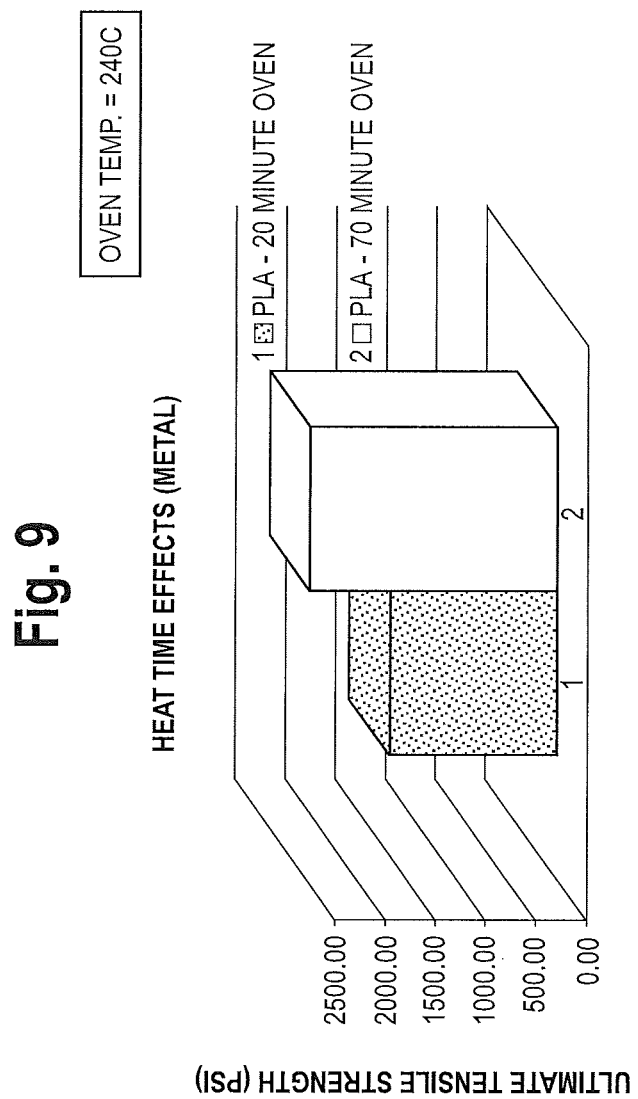
FIG. 9 provides tensile strengths for joined steel dowels using PLA powder when dowels were joined with adhesive heated in an oven for 20 and 70 minutes, as described in Example 4.

FIG. 9 shows the results of testing when using PLA powder feedstock to join steel dowels in an oven maintained at 240° C. The bond strengths varied between about 1,600 psi (for time at temperature of about 20-min.) vs. close to 2,500 psi (for time at temperature of about 70-min.). This variation represents about a 56% increase in bond strength.

Figure 10:
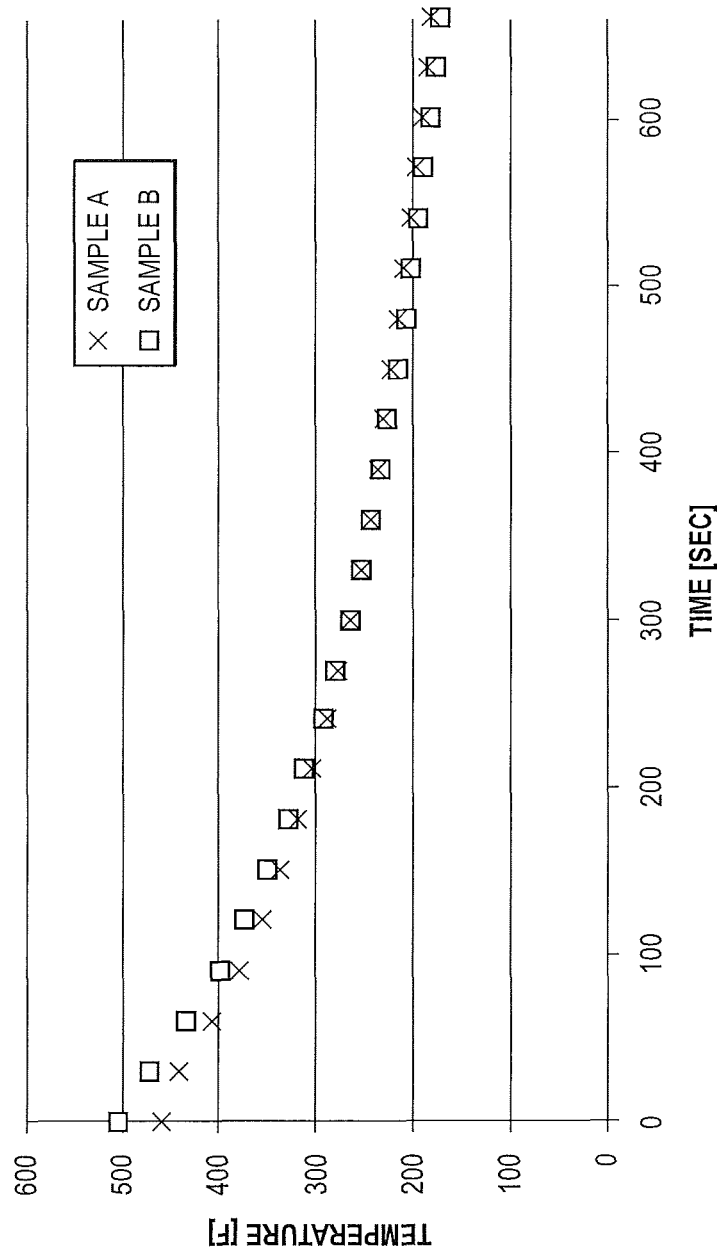
FIG. 10 provides data showing the cooling curves of joined steel dowels described in Example 4.

FIG. 10 depicts the cooling curve of steel dowels in room temperature air. Results of experiments using three different methods of application are described below.

In a variant of the method for application, the steel dowels were preheated to about 280° C. using the Wagner HT1000® hot air gun after which 3 beads of PLA resin were introduced in the gap between the dowels. Upon melting and joining, the steel dowels were allowed to cool down to room temperature. On testing, the level of about 4,800 psi on average was obtained. This represents close to 100% improvement in bond strength using the oven-based method.

Using the same joining method as just described (i.e., preheating with the HT1000® to 280° C. and introduction of the resin beads), the joined steel dowels were quenched with room temperature water. In this case, the resulting strength on average varied between 3,000 psi to 3,600 psi. A study of the morphology of the glued joints indicated the presence of tiny bubbles—which is believed to have led to the reduction of bond strength from the previously attainable 4,800 psi.

The cause of the reduction from bubble formation was suspected to be due to the absence of a uniform mixture of PLA in the joint prior to subjecting the system to thermal shock from quenching. In order to remedy this, after introduction of the 3 PLA resin beads and permitting to melt before pressing the dowels together, the hot air gun was turned back on to reheat the adhesive joined system to about 240° C. prior to quenching with water. This led to an enhancement of bond strength to over 43 MPa (6,200 psi). Morphology of the joint indicated an absence of microbubbles. The value of 6,200 psi represents about a 250% increase in bond strength compared with the levels obtained using oven-based method of application.

Example 5

This example demonstrates the tensile strength of adhesive joined aluminum and carbon steel T-bar specimens.

Results obtained with increasing strength were: (a) about 200 psi for Al T-bar (adhesive 70 min glue stick based with preheating of the Al T-bar to 150° C.); (b) about 210 psi for carbon steel coupons (adhesive 70 min. glue stick with 200° C. preheating); (c) about 675 psi for joined carbon steel T-bars (PLA rod feedstock melted in between the gap of T-bars using a HT1000® hot air gun for 5-min.—the precise temperature was not measured but it is estimated to be about 200° C.); (d) about 1,150 psi for joined carbon steel T-bars (PLA rod feedstock melted in between gaps of the T-bars in an oven for 20-min. at 240° C.); and, (e) about 1,875 psi for carbon steel T-bars (PLA rod feedstock melted in between the gaps of the T-bars in an oven for 70-min. at 240° C.).

Example 6

This example provides a comparison of bond strengths on wood substrates joined with the disclosed PLA adhesive, Gorilla Glue® and Superglue®

Without Preheating—Bond Strengths for Wood Substrates

Hardwood cassettes were joined using the manufacturer specified directions using Gorilla Glue®, and Superglue®. Both sets of specimens were allowed to cure for 24 hours before testing. PLA adhesive based test samples were prepared and were available for testing immediately. Results of bond strength testing show that a level of about 137 psi was obtained with Superglue®, about 293 psi with the disclosed PLA adhesive (using 70 min, 240° C. glue stick) and about 402 psi with Gorilla Glue®.

With and without Substrate Preheating—Bond Strengths for Wood Substrates

The results obtained with substrate preheating are in stark contrast with those obtained without preheating. The bond strength obtained with preheating the wood cassettes to about 205° C. before application of PLA resin (followed with cool down for 10 min.) resulted in a bond strength of over 824 psi. This level is significantly higher than that obtained with Superglue® (about 137 psi) and 670 psi with Gorilla Glue®-both of which required a 24 hour curing time before testing.

Comparison of Bond Strengths on Steel Substrates—Adhesive Versus Gorilla Glue™, JBWeld™, and Superglue™

As for comparison of bond strengths with wood substrates, testing was used to assess bond strengths on steel substrates (cylindrical dowels).

Without Quenching—Bond Strengths for Steel Substrates (Adhesive Vs Conventional Adhesives)

In the case of PLA adhesive joining material the PLA powder was in an oven at 240° C. where the joined specimens were maintained for 70 min. and a bond strength of about 2,475 psi was obtained. This is compared to bond strength of about 1,500 psi with JBWeld™ (requiring a 24 h set time), about 510 psi with Gorilla Glue® (24 h set time), about 250 psi with traditional hot glue dispensed via hot glue gun, and about 100 psi with a hot glue stick rated "pro strength" dispensed via hot glue gun.

With Quenching—Bond Strengths for Steel Substrates (Adhesive Vs Conventional Adhesives)

When PLA resin beads were used to join steel dowels preheated to 280° C. prior to introduction of resin beads followed with reheating to about 200° C. and quenching, a tensile strength of about 6,200 psi was obtained. Using Gorilla Glue® for joining followed the manufacturer directions with and without clamping of the steel dowels after application and overnight set for which levels of about 950 psi and 1,050 psi was observed (without and with clamping), respectively. This example shows that compared with the widely used Gorilla Glue®, adhesive performance is about 600% higher—and that too, without long, (e.g., 24 h) set/curing times required for conventional joining materials like Gorilla Glue®, JBWeld® and Superglue®.

Example 7

This example demonstrates the effect of irradiation on various PLA adhesive embodiments.

Irradiation and No Cross-Linking Agent)

For these studies, the steel dowels were joined with raw PLA in about 500 micron diameter powder form. The joining was conducted in an oven at 240° C. with time at temperature set for 70 min. The joined steel dowels were subject to a dose of 18 kGy using Purdue's $Co^{60}$ gamma photon irradiator (which provided dose at the rate of about 4.5 Gy/min.). Separately, PLA powder by itself was irradiated first to 18 kGy dose and then used to join the steel dowels in the oven in the same manner as done before with unirradiated PLA powder. Results of testing for bond strength show that for the control case (no irradiation) an average bond strength of close to 2,500 psi. was observed. For the case where unirradiated PLA powder was used to join the dowels prior to irradiation, the bond strength reduced by about 10% to about 2,250. Finally, for the third case involving use of pre-irradiated PLA powder to join steel substrates the bond strength reduced further to about 2,100 psi (i.e., by about 16% from the control sample). These results indicate that gamma photon irradiation in itself will act to degrade the bond strength. Even with relatively modest dose levels of only about 18 kGy reductions by about 16% could be attained thereby, providing a means to start from a baseline and tailor the strength to be reduced to a desired level as may be required for a given application. An example for such an application may be situations where a joint should debond past a certain tensile stress for safety or other performance needs. Furthermore, pre-irradiating PLA prior to joining substrates could be more effective for greater reduction in bond strength from a certain baseline.

Irradiation with Cross-Linking Agent

For these studies, as before, the steel dowels were used along with PLA in powder form. In this case, TAIC (in liquid form) was mixed in a stirrer with PLA powder in a 10:1 proportion. Three sets of steel dowel samples were prepared. The first set (without TAIC nor irradiation) served as the control.

The second set was made with TAIC mixed into the PLA powder but without use of irradiation. The third set was subjected to gamma photon irradiation in the $Co^{60}$ irradiator—the dose level was 5 kGy (at 4.5 Gy/min). In these studies three control samples all provided bond strengths of about 2,900 psi. which was about the same as the sample containing TAIC that was not irradiated. However, even with very modest levels of radiation dose (about 5 kGy), a very noticeable (about 10%) increase in bond strength was seen (i.e., up from about 2,900 psi to over 3,200 psi). This example demonstrates that a 100% increase in bond strength between the disclosed adhesive and substrates such as steel with an irradiation dose of about 50 kGy.

Example 8

This Example demonstrates the use of the disclosed adhesives to coat and join, seal and repair a variety of substrates.

Wood Dowels

Since the auto-ignition temperature of wood is about 270° C. care was taken to preheat the dowels to levels below this value. The two wooden dowels were first preheated with the hot air gun (at low setting) at a distance of about 2", for about 1 minute to an estimated temperature of only about 100° C. Adhesive (70-min., 240° C.) was dispensed over one of the dowel interface surfaces using a hot glue gun and the two wood dowels were then pressed together. The system could not be pulled apart after a wait time of 15 seconds and a bond strength approaching 825 psi was attained. A similar result was observed without preheating of wood but the resulting bond strength is expected to remain below about 300 psi.

Light-Colored Engineered Hardwood

In this case a 30 mil (0.76 mm) sheet of PLA was used over the wood specimen within an oven at 205° C. for 15 minutes after which the molten form of PLA was rolled flat with a steel bar. This system was annealed at 375° F. for 45 min. prior to allowing it to cool in a room temperature environment. An alternate method giving similar results involves melting a 30 mil PLA sheet on top of the wood at 200° C. for about 120 minutes followed by mechanical removal (e.g., rolling or bubble removal) of imperfections followed with cooling at room temperature. Similar results could be obtained by use of 1.5 mil (40 micron) PLA sheets.

Coated-Joined Block of Dark Colored Engineered Hardwood and Natural Hardwood

These joints were prepared in a manner similar to that described earlier for light colored engineered hardwood.

Aluminum Panels

In this case, a 30 mil (0.76 mm) sheet of PLA was placed onto the substrate and subject to thermal radiation at 191° C. for about 2 h at which time the surface layer smoothened out and the system was permitted to cool on a counter top at room temperature.

Aluminum T-Bars

In this case, the T-bars were heated to about 260° C. within a few minutes with the hot air gun (high setting) positioned about ½" away from the nozzle. PLA resin beads (melt temperature less than about 230° C.) were introduced between the two T-bars and pressed together. During this time the hot air gun was stopped to avoid blowing off the resin beads. Upon joining the hot air gun was positioned about 10" away to reheat the T-bars to about 260° C. (to ensure good bonding between adhesive and aluminum) prior to allowing the system to cool down to room temperature.

Carbon Steel T-Bars

The procedure for carbon steel T-bars was similar to that described for joining aluminum T-bars.

Borosilicate Glass Vials

In this case, the ends of the vials were heated to about 260° C. using the hot air gun (high setting at about 6" distance. An Omega® thermocouple (T/C) monitored the temperature of the glass base of each vial). Adhesive (70-min., 240° C.) was applied using a hot glue gun while the hot air gun was still on. Upon adhesive delivery the two vials were hand-pressed together and allowed to cool down to room temperature. This procedure allowed for a very significant enhancement in bond strength; however, glass vials can be joined while even at room temperature and use of adhesive (70-min., 240° C.) dispensed directly from a hot glue gun as well. For such cases, one still can attain a sufficiently robust bond that prevents manual separation.

Plate Glass

In one method the glass plates were heated using the hot air gun to about 260° C. after which adhesive was dispensed with a hot glue gun and the two sections pressed together and allowed to cool. In an alternate, oven-based method eight PLA resin beads were distributed evenly over the surface of one (1"×1") plate glass section and then covered by the second plate. The system was next heated with the hot air gun to about 260° C., above the upper range for melt temperature. The resin beads melt and uniformly spread to form a clear coating to wet the entire surface area. The two sections were hand-pressed and allowed to cool to room temperature. The composite section was subject to impact loading using a punch and hammer to result in considerable cracking of the glass sections; however, the system as a whole held together without any sign of splintering or fragmentation.

Blocks of Ultra High Molecular Weight Plastic

A hot air gun was used to heat the blocks to about 150° C. (which is about the melting temperature of adhesive (70-min., 240° C. glue stick) and when signs of melting were noted, adhesive was dispensed with a hot glue gun over each surface and the two blocks hand-pressed and allowed to cool to room temperature. The resulting joint could withhold hand-based separation but is not expected to exhibit significant bond strength as noted earlier for wood, metal and other plastic substrates.

Thin Polystyrene Plastic Trays

Two thin (less than about 0.5 mm thick) polystyrene plastic trays were joined. In this case, adhesive was dispensed directly onto the base without any substrate preheating using a hot glue gun (using 50-min., 240° C. glue stick) and the system allowed to cool to room temperature. It was found that the resulting bond was strong enough to prevent peeling without tearing of the polystyrene material itself.

Marble Slabs

In this case, to avoid damage to the substrate, the hot air gun (with setting on high) was used to preheat the marble slabs to about 150° C. (corresponding to the approximate melting temperature of adhesive (70-min., 240° C. glue stick) after which adhesive was dispensed from the hot glue gun (using 50-min., 240° C. glue stick) to cover the surfaces. The two sections were hand pressed together and allowed to cool to room temperature. An alternate technique which also has proven successful is to place a PLA sheet in between the two marble slabs and the system heated to about 190° C. (i.e., above the PLA melting temperature of about 160° C.) before pressing the two slabs together and allowing the system to cool.

Ceramic China

In this instance, a plate of china was cracked into multiple sections. Two of the sections were first heated to about 150° C. with the hot air gun and adhesive was dispensed at the joint surface using the adhesive hot glue gun (using 50-min., 240° C. glue stick) and pressed together after which excess adhesive was wiped off and the system allowed to cool to room temperature.

Ceramic Cinder Block

In this case, the block surfaces were heated using the hot air gun to about 150° C. (which is close to the (50 min, 240° C.) PLA glue stick melting temperature—measured with a T/C. Adhesive was dispensed using the adhesive hot glue gun (using 70-min, 240° C. glue stick). The blocks were hand-pressed together and allowed to cool. Bonding of cinder blocks can also be accomplished using prearranged beads of PLA resin between the two blocks which are placed in a radiant oven environment at temperatures above the melting temperature of PLA resin (about 230° C.). One issue to remain cognizant of is that concrete may have dissolved water which can start to degas above 100° C., but once the venting is complete from the interface areas, molten PLA readily fills pores and bonds well.

Red Brick

The method for joining was similar to that used for joining concrete cinder blocks.

Step Stones

The method for joining was similar to that used for joining concrete cinder blocks.

Plugging Holes in Metal Sections

Sections of rusted steel bracket, rusted steel plate and aluminum plate with intentionally drilled holes were used. For such an operation, in order to avoid the part to be repaired from becoming bonded to the underlying support structure, a foil of aluminum is placed beneath the section to be repaired. Depending on the size of the hole one or more PLA resin beads can be placed directly onto the hole and the system heated using the hot air gun with the setting on low initially to prevent the solid PLA beads from blowing away. Once the PLA resin begins to melt it begins to bond to the steel substrate and fills the hole at which time the process can be accelerated by increasing the heat to the high heat setting. Alternatively, adhesive may be dispensed over the hole directly using a hot glue gun (using 70-min., 240° C. glue stick). The system can then be allowed to cool to room temperature or rapidly quenched in water (if enhanced strength is desired). Once cool the underlying aluminum foil is amenable to being peeled off.

Sealing Punctured Cans

PLA adhesive can also be used to repair punctured cans of aluminum as well as an acrylic containers. In these instances, adhesive was directly applied to the substrates while they were at room temperature using a hot glue gun (using 70-min., 240° C. glue sticks). The cans and the acrylic tube were filled with water and kept in the laboratory at room temperature without leaking for over three months.

Using the disclosed methods it has also been possible to join polytetrafluoroethylene sheeting having an approximately 10 micron thickness with aluminum and also steel substrates. The bond strengths appear to be in the expected range of about 50 to 100 psi.

Example 9

This example demonstrates various methods and apparatus for using the PLA adhesive. The bond strength attained between adhesive and substrate will necessarily be the minimum of the cohesion strength of the adhesive itself, and the adhesion strength attained between the adhesive and substrate. For PLA resin the cohesion (tensile) strength has been reported to be about 49 MPa (about 7,000 psi) with a melting temperature above about 200° C. However, upon mechanical molding, irradiation (with or without cross-linking agent) or thermal treatment, this value can change significantly. For example, by melting PLA resin and holding it for 70-min. at 240° C. and then casting into glue sticks, the adhesive will melt and flow at temperatures as low as about 150° C.

Bonding or adhesion requires mating of molecules of the adhesive and the substrate so that they molecularly interlock. This may involve surface wetting and ingression into pores of substrate and also electron-level interactions at the molecular level (i.e., via Van der Waal dispersion forces) as the electrons of the glues attract and bond with the positively-charged substrates. As a consequence, we have earlier shown that adhesive (20 min., 240° C. glue stick) while still much stronger than adhesive (70-min., 240° C. glue stick), the bond strength attainable (e.g., for non-preheated wood substrates) is much higher for the bond made with the weaker adhesive (i.e., 70-min. vs 20-min., 240° C.).

Adhesive bonding can be optimal when the adhesive being applied to a substrate is above the melting temperature of the adhesive formulation. This ensures that the adhesive will penetrate pores to enhance the surface area of interaction for bonding (via interlocking and charge-based joining). The melting temperature can range from about 150° C. (for 70-min., 250° C. glue stick formulation) to about 200° C. (for 20-min., 250° C. glue stick formulation), and even higher at about 230° C. for PLA resin. Substrate activation to enhance bonding via adhesive via substrate preheating to temperatures above melting temperature of the specific adhesive being applied has also been demonstrated as useful (although not mandatory). This is especially so for substrates which are ultra-smooth such as ultra-high molecular weight plastics wherein pore penetration related interlocking becomes challenging and surface activation via preheating has shown to be of use for enabling charge polarity differences based bonding via Van der Waal attractions. Chemical reactions between adhesive and substrates are unnecessary for adhesion using the disclosed PLA adhesives. Nevertheless it is possible that the disclosed PLA adhesives could be improved by employing chemical bonding.

Temperature levels below those associated with fuming of the PLA itself are also generally desired. PLA is found to fume at about 290° C. or more.

Therefore, the adhesive application range will vary between 150° C. (e.g., for application of 70-min., 240° C. glue stick material) through 290° C. if using PLA resin.

Wood and wood products (e.g., paper, dowels, toys) in general (assuming about 15% moisture content) can ignite above about 275° C. Hence, a basic limitation requires that these materials remain at or below 275° C. while applying adhesive to such surfaces. On the other hand wood possesses significant porosity and low thermal conductivity, which facilitates the use of the disclosed adhesives for coating- and joining applications.

Ultra-smooth substrate materials such as polystyrene will not offer significant porosity for adhesive to penetrate. Such plastics also exhibit significant fuming at or above about 150° C. Therefore, to activate such surfaces while dispensing adhesive, the adhesive formulation utilized should be tailored appropriately. For example, adhesive (20-min., 240° C.) with a melting temperature significantly above 150° C. may not provide adequate functionality. An adhesive glue stick with a greater degree of thermal treatment (e.g., 80-min., 240° C.) with a melting temperature around or below 150° C. can be more appropriate in such circumstances.

There are two reasons to preheat substrates. Heating can activate the substrate surface to promote bonding. This occurs by improved penetration for mechanical interlocking benefits as also for enhanced intermolecular bonding via charge coupling. Using appropriate preheating for wood substrates it is possible to improve the bond strength with adhesive from 300 psi to over 825 psi; for steel substrates the bond strength has been shown to be possible to raise to over 6,200 psi by pre-heating the steel substrate to about 250° C. while applying adhesive in resin form.

The second reason for preheating involves conditions wherein the substrate is thick and also of a material with high thermal conductivity (and diffusivity). Highly conductive substrates can rapidly quench the adhesive to result in rapid solidification prior to sufficient wetting and electron exchange. Such an issue only arises when joining outside of an oven environment (e.g., via use of a hot glue gun). Under such circumstances, care must be taken to ensure that the interface temperature between the substrate and adhesive is at temperatures above the melting temperature of the specific formulation of the adhesive.

For low thermal conductivity (diffusivity) materials such as wood, brick, concrete, etc. the adhesive may be directly dispensed to provide bond strengths of about 300 psi which is a significant improvement over most known adhesives).

For attaining enhanced performance, reheating of a just-bonded substrate at temperatures comparable to the melting temperature of the specific adhesive ensures minimization of bubble inclusions which can act as stress-concentration locations which can reduce the resultant bond strength.

We have found that rapid quenching in water of adhesive joined substrates (from about 250° C. to room temperature) can encourage formation of amorphous (fault-free) bonded systems which can exhibit tensile strengths significantly higher (by over 50%) than joined substrates that were merely allowed to cool down in air.

It is also possible to enhance the bond strength of adhesive containing 10 wt. % TAIC crosslinking agent joined steel substrates by over 15% with only about 5 kGy of gamma photon irradiation. It is expected that close to 100% gain in bond strength CAN be obtained by gamma photon irradiation to about 50 kGy. An ancillary benefit is that the working temperature can be raised from about 70° C. (the normal glass transition temperature for PLA) to over 200° C. Irradiation may be conducted also via UV lamps (for surface effects alone), or via electron beams with energy tailored for penetration depth via computation of dE/dx via known methods and computer programs, or via use of neutron sources (with and without addition of neutron absorbers such as boron (B) powder in the adhesive composition so as to amplify the radiation doses from alpha-n reactions).

In the absence of a cross-linking agent it is possible to reduce the tensile bond strength by about 25% with about 20 kGy of gamma photon irradiation. Irradiation alone can lead to chain scission resulting in reduction of the melting temperature of the adhesive material all the way down to about 120° C. Such a reduction in melting temperature allows for much lower hot glue gun power levels for dispensing.

Figure 11:
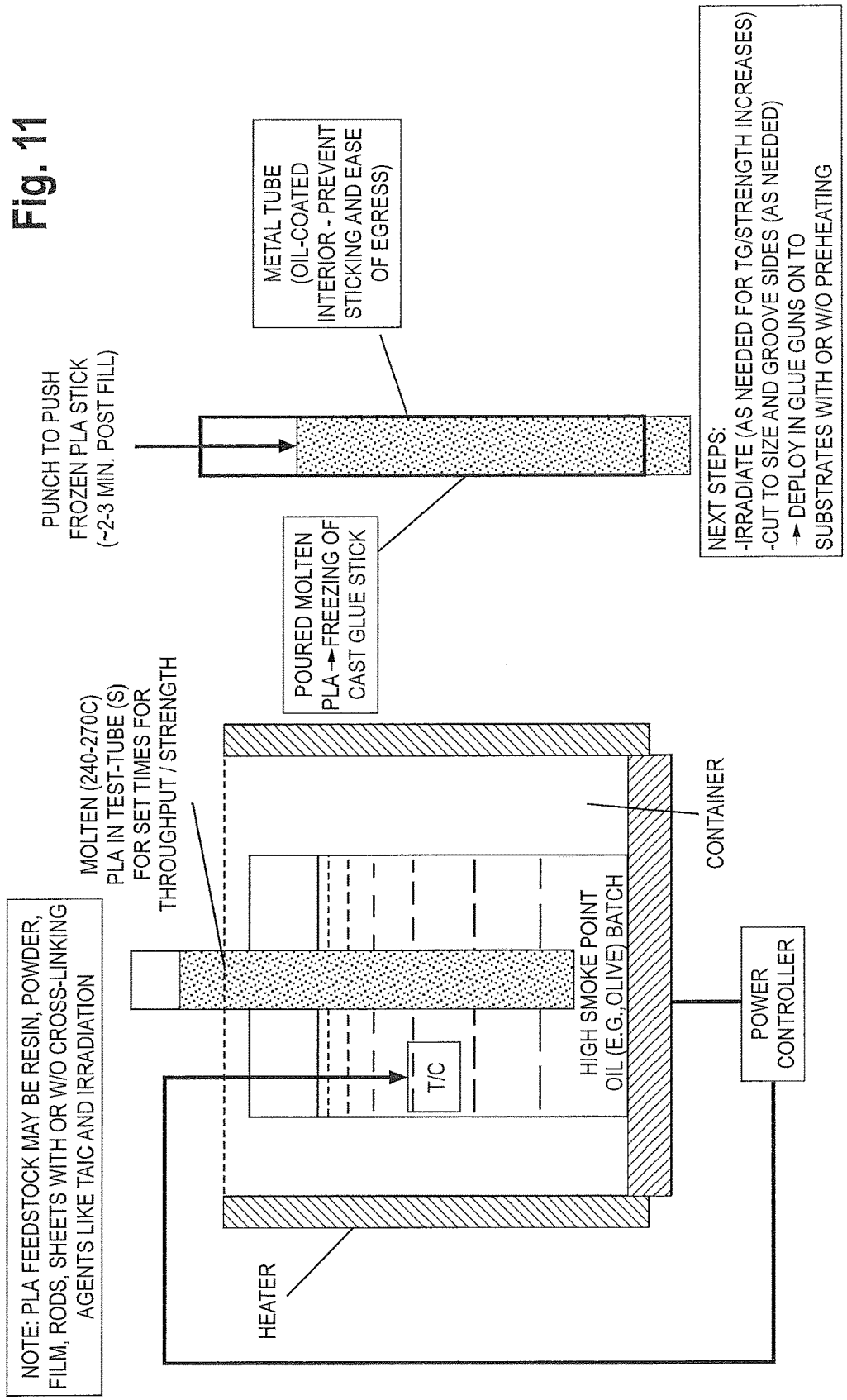
FIG. 11 illustrates a method for PLA adhesive glue stick preparation using a constant temperature bath.
Figure 12:
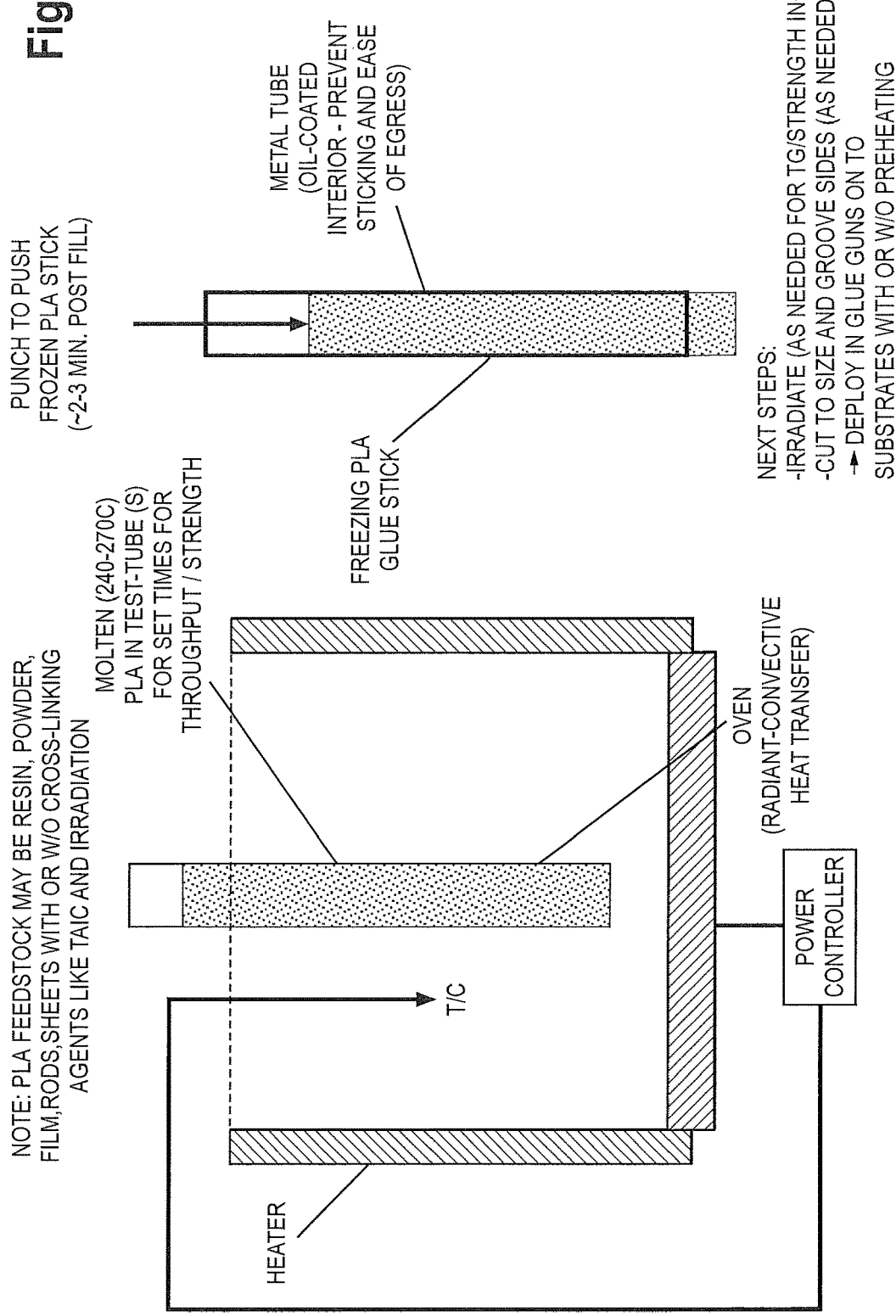
FIG. 12 illustrates a method for PLA adhesive glue stick preparation using an oven based method.

FIGS. 11 and 12 illustrate the key steps associated with melting and casting of adhesive glue sticks using either a constant temperature oil-bath or via use of a constant temperature oven.

FIG. 13 illustrates a device for automated formation of adhesive glue sticks in a high volume.

Figure 14C:
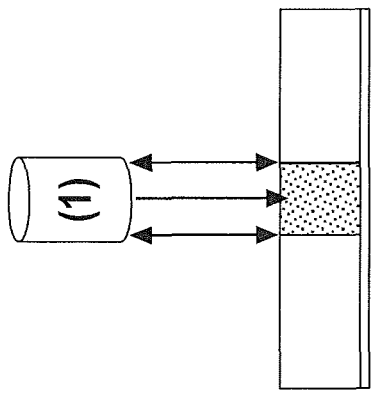
FIG. 14C illustrates a temperature substrate sensor 5 and excess adhesive catcher such as aluminum foil for preventing oozing. The foil can be peeled off. For optimal tensile strength the substrate should be aligned in parallel to minimize bending and stresses induced by peeling off. Substrates may also be aligned one on top of the other with PLA resin distributed between layers prior to heating. Upon PLA glue addition substrates should be pressed together with force as required to obtain the desired adhesive thickness while glue is molten and above its melting temperature.
Figure 14B:
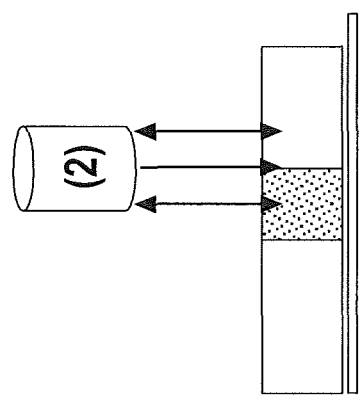
FIG. 14B illustrates a controlled hot air or radiant lamp source with PLA resin dispensing between substrates with controlled reheat to cooldown (with or without quench).
Figure 14A:
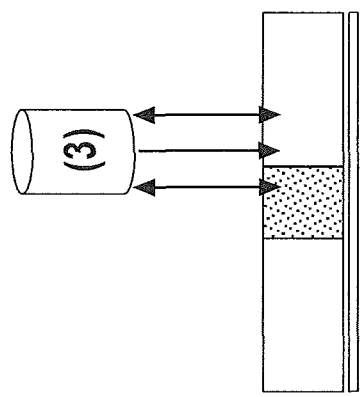
FIG. 14A illustrates a controlled hot air or radiant lamp source 1.

The various attributes of apparatus and stepwise method for direct heat-based application method of PLA resin is further illustrated in FIG. 14. In this instance, the PLA that is dispensed is in PLA resin bead form (with or without irradiation and cross-linking agent, such as TAIC). The batch of PLA resin utilized for these studies was purchased from Nature Works, LLC for which we note that each bead has an average mass of about 40 mg and encompasses a volume of about 0.032 cc/bead while solid. The variation of density with temperature demonstrates that the density can reduced by about 15% when the resin is heated from 20° C. to about 200° C. Therefore, the number of resin beads to be metered for a given job would remain commensurate with the gap to be filled or the area to be covered (in case a layered set of substrates is desired). The heat source can be a commonly marketed hot air gun. This system can be used to heat glue and substrates to desired temperatures for all of the joined items described in this specification within 1-5 minutes of heating time. Alternately, a radiant heater lamp of similar wattage can be used. A temperature sensor can be used to monitor the substrate temperature to permit preheating or reheating as necessary for enhanced bonding. An added structure (e.g., foil of aluminum) placed below the substrates may be used to prevent and capture leaking of excess adhesive and/or to avoid having the joined substrates stick to support structures. Upon removal of the joined substrates, a simple quenching in water at room temperature can be used to peel off the aluminum foil.

Figure 15B:
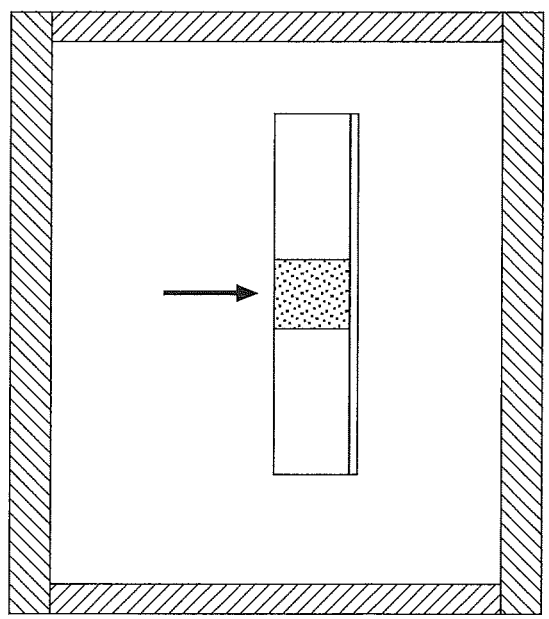
FIG. 15B illustrates that the oven is capable of a controlled cooldown.
Figure 15A:
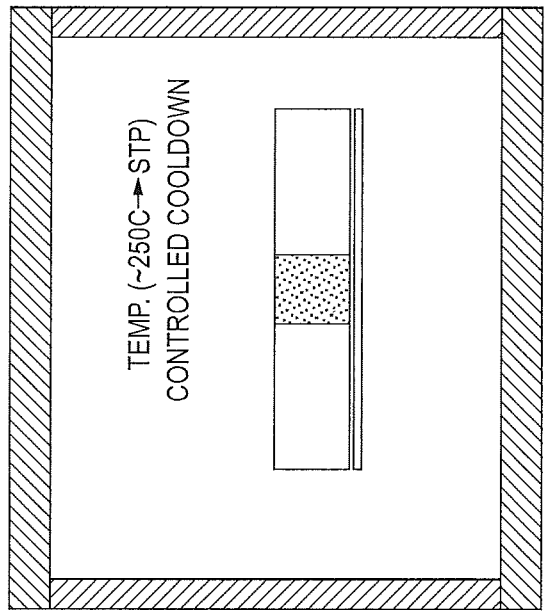
FIG. 15A illustrates substrates (3) layered on top of one another with PLA adhesive (5) layered there between to a desired thickness and an excess adhesive catcher (5).

Similar to the direct (hot air/radiant lamp) based system, FIG. 15 depicts the apparatus and method for joining substrates in a controlled temperature oven-system. As before, the substrates may be placed side-by-side or layered one on top of the other.

The time required for throughput is generally governed by the time it takes for the PLA to reach the required temperature for joining purposes. For this estimate the thermal time constant (t) may be derived from the following equation:

$$\frac{T-Ta}{Ti-Ta} = e^{\frac{-hAt}{mCp}}$$

where, T is the temperature of the body of mass "m" with surface area "A", specific heat capacity "Cp" in an environment where the convective heat transfer coefficient is "h." Ti is the initial temperature of the body when placed in an environment of temperature, "Ta". The above equation stipulates that the body will attain the final ambient temperature exponentially with a time constant=hA/(mCp); i.e., in the inverse of this much time, the body will reach to about 68% of the ambient level of Ta. Depending on whether the environment is liquid (e.g., water), or air the value of "h" will be different. From heat transfer studies the values of "h" are known and tabulated in Table 6.

TABLE 6

Range of heat transfer coefficient "h" under various ambient conditions

| Condition | (W/m²-K) |
| --- | --- |
| Air - free to forced convection | 5 to 50 |
| Water - free convection | 20-100 |
| Water - forced convection | 50-10,000 |
| Water - nucleate boiling | 3,000-100,000 |

For the various methods discussed in this report, the adhesive glue is to be heated using forced air based convection. Assuming, for example, a single adhesive bead of PLA resin for which, m=3.8×10⁻⁵ kg; Cp about 2 kJ/kg; about 4.9×10⁻⁵ m². Assuming a value for "h"=50 W/m²-K, the time it will take for the bead of these dimensions to reach about 65% of the ambient temperature will be less than a minute. Therefore, the heatup times for the adhesive glue itself can be expected to be small (as has been evidenced from experience). The time would likely be more or less controlled by the time it takes for the substrates to heat up to a given temperature (in case preheating is warranted). For example, for a sheet of plywood of density about 500 kg/m³ and thickness=¼" (=6.5 mm) and a surface area of 3.3 ft×3.3 ft (1 m²); therefore, mass "m" about 3.2 kg, for which Cp about 1.7 kJ/kg-K the time taken to reach 65% of the ultimate temperature would be about 2 minutes.

The above estimates did not account for radiative heat transfer which can become significant as the heat source temperature rises. The radiative heat flux ($q''_{rad}$) may be estimated to the first order as, $$q''_{rad} \text{ about } \varepsilon\sigma(T^4) \text{W/m}^2\text{-K}$$

where, ε is the emissivity, σ is the Stefan-Boltzman constant (=5.67×10⁻⁸ W/m²/K⁴), and, T is now the temperature of the heating source. The emissivity "ε" can vary from about 0.04 (for brightly polished surfaces such as bright rolled aluminum or polished copper), to about 0.99 for acetylene soot. For an ambient environment in a radiative oven with a radiant source at about 2000K, and assuming "ε=0.5", the heat flux incident on the adhesive bearing substrate would be about 4.5×10⁵ W/m². Therefore, for a normally-absorbing body such as plywood, with surface area of about 1 m², Cp about 1,700 J/kg-K, and mass of about 3.2 kg the body-averaged heatup rate amounts to about 4.5×10⁵/(3.2×1700) or about 80 K/s. This would indicate that the body could reach the desired temperature of up to about 300° C. very rapidly, within seconds. Even if the radiant lamp was at 1,000° K, the radiant flux would amount to about 3×10⁴ W/m², for which the rate of heatup from radiant heat transfer would be about 7 K/s.

The enthalpy of fusion for PLA is about 93 kJ/kg. The mass of adhesive. glue over 1 m² of plywood would be far less than 1 kg, and at an incident heat flux of about 5×105 W/m²-K the time for melting would be negligibly small.

Various means can be employed to reverse adhesive bonding with disclosed adhesives.

In case the adhesive has not been specially formulated to embody enhanced temperature and strength (via cross linking agent and irradiation), the bonded substrates may be separated via application of heat such that the temperature of the system exceeds at least the glass transition temperature (viz., about 60-80° C.). For example, use of boiling water could allow one to reach such softening temperatures or alternately, one may be able to use a hot air gun such as the Wagner HT1000® at either high or low settings or other forms of thermal treatment (e.g., radiant lamps, oven based, etc.). Upon exceeding the glass transition temperature, PLA in general begins to soften and loose strength exponentially such that, minimal force is necessary to separate the joined structures once a critical temperature is exceeded. Several of common industrial solvents such as acetone may also be used to soften the adhesive without the need for heat. Alternately, if available, the joint may be overcome with sufficient tensile force that is commensurate with the bond strength attained while joining. For the special cases where irradiation has been employed to vastly enhance the properties of adhesive, the required temperatures for softening the joint will be necessarily higher (above about 200° C.). Solvent and force-based removal methods would also apply to such situations.

Alternate methods for direct radiant heating outside of ovens using heat lamps in the 500 W range, for example, can be used. Radiant lamps, as opposed to hot air guns, permit minimal heat loss from air convection and permit the simultaneous application/dispensing of resin pellets while heating.

In certain embodiments adhesive performance can be used in a thermal environment of above about 200° C. In such embodiments TAIC can be used at a concentration of above about 3 wt. % and about 50 kGy of irradiation or more.

The disclosed adhesive based adhesives offer numerous benefits including rapid application, typically within about a minute, the joining of virtually any type of substrate without the need for special preparation or cleaning, vastly superior bond strengths which can be tailored for specific purposes, enhanced throughput in addition to utilizing green-chemistry and being free of volatile organic compounds.

Example 10

This example demonstrates first order effects of adding a plasticizer to polylactic acid using a Shore D durometer to monitor for hardness (and consequently, the elasticity or pliability of the adhesive formulation).

35 g of PLA resin is measured into a 25×250 mm rimless Pyrex test tube which has been burned out at 650° C. to remove any residue. At this point a microcontroller regulated oil bath was preheated to 255+/−25° C. and 6 test tubes inserted in the bath. After each tube has been in the bath for 70 minutes they are either directly poured into PTFE cylinders (1.75" ID and 2" OD) or a plasticizer is injected via syringe at specified weight percentage. Mixing of the plasticizer was accomplished with a 0.25"×11" cooper rod doing 20 clockwise and 20 counterclockwise stroke. Green food dye was used as a tracer to ensure thorough mixing.

After the gravity cast PLA slug has cooled, the slug is gently removed from the cylinder. On occasion the edges are concave and a butane torch can be used to flatten the top portion of the slug. He slug can be used in a pneumatic glue gun and hardness values can be recorded to ensure uniformity amongst different batches. To do this a Shore D durometer is depressed into the sample and the value is recorded after 10 seconds. For each slug four points were chosen equidistant from one another starting from the bottom and rotating 90 degrees each measurement with the final measurement at the top of the cylinder. Results are provided below in Table 7. In summary, the group average Shore D hardness value for plasticized samples was 40.0 with the highest slug averaging 45.5 and the lowest 29.5. The spread on all measured values (4 each) for the 16 slugs used was between 25 and 52. For the PLA glue slugs the group average was 75.6 with the highest slug averaging 79.8 and the lowest 70.0. The measurement of each hardness value has error due to imperfections in the surface of each glue slug.

When plasticizer is used, a quantity of plasticizer is placed into syringe which is then injected into the molten PLA approximately 5 minutes before casting. To test the effectiveness of mixing, food dye can be added to the plasticizer and evaluated for even coloring.

TABLE 7

Measured hardness values of each glue slug with and without plasticizer.

| Sample # | 1 | 2 | 3 | 4 | Average | Spread |
|---|---|---|---|---|---|---|
| Plasticized PLA-70 Samples (10 wt % Proviplast 25422) Shore D Hardness Measurement | | | | | | |
| 1 | 36.0 | 39.5 | 31.0 | 25.0 | 32.9 | 14.5 |
| 2 | 43.5 | 40.0 | 38.5 | 41.0 | 40.8 | 5.0 |
| 3 | 36.0 | 35.5 | 35.5 | 34.5 | 35.4 | 1.5 |
| 4 | 36.5 | 40.0 | 48.5 | 46.5 | 42.9 | 12.0 |
| 5 | 37.5 | 40.5 | 48.0 | 44.0 | 42.5 | 10.5 |
| 6 | 38.0 | 45.0 | 42.0 | 46.0 | 42.8 | 8.0 |
| 7 | 46.0 | 39.5 | 52.0 | 38.0 | 43.9 | ??? |
| 8 | 31.5 | 27.0 | 29.0 | 30.5 | 29.5 | 4.5?? |
| 9 | 38.5 | 36.5 | 46.0 | 36.5 | 39.4 | 9.5? |
| 10 | 42.0 | 36.5 | 45.0 | 48.5 | 43 | 12.0 |
| 11 | 47.5 | 40.5 | 46.5 | 47.5 | 45.5 | ?? |
| 12 | 35.5 | 37.5 | 40.0 | 37.5 | 37.63 | 4.5 |
| 13 | 40.0 | 43.5 | 35.0 | 42.5 | 40.3 | 8.5 |
| 14 | 41.0 | 32.0 | 52.0 | ?? | 42.8 | 20.0 |
| 15 | 42.0 | 40.0 | 39.5 | 4??5 | 40.8 | 2.5 |
| 16 | 45.0 | 40.0 | 37.5 | 41.0 | 40.9 | 7.5 |
| Pure PLA 70 Samples Shore D Hardness Measurement | | | | | | |
| 1 | 81.5 | 7?? | 7??5 | 71.5 | 74.9 | 10.0 |
| 2 | 79.0 | 80.0 | 67.5 | 76.5 | 75.8 | 12.5 |
| 3 | 77.5 | 81.0 | 81.5 | 75.0 | 78.8 | 6.5 |
| 4 | ??.5 | 73.0 | 77.5 | 75.0 | 75.3 | 4.5 |
| 5 | 77.0 | ?1.5 | 77.0 | 83.5 | 79.8 | 6.5 |
| 6 | 74.?? | 73.5 | 80.0 | 80.5 | 77.0 | 7.0 |
| 7 | 71.5 | 68.0 | 69.5 | 79.5 | 72.1 | 11.5 |
| 8 | 72.5 | 77.5 | 78.0 | 78.5 | 76.6 | 6.0 |
| 9 | 76.5 | 66.5 | 77.5 | 79.0 | 74.9 | 12.5 |
| 10 | 67.0 | 73.0 | 69.0 | 71.0 | 70.0 | 6.0 |
| 11 | 80.5 | 67.0 | 80.5 | 79.5 | 76.9 | 13.5 |
| 12 | 74.0 | 77.0 | 74.0 | 77.0 | 75.5 | 3.0 |
| 13 | 79.5 | 79.5 | 78.5 | 77.5 | 78.8 | 2.0 |
| 14 | 73.0 | 73.5 | 75.5 | 72.5 | 73.6 | 3.0 |
| 15 | 68.0 | 75.0 | 79.5 | 73.0 | 73.9 | 11.5 |

Due to the imperfect nature of gravity cast PLA there can be small craters and bubble like depressions on the surface of these slugs. For that reason at least four values for each sample were used to determine an average. Injection molding could be used to produce completely smooth slugs with no voids. Because glass transition temperature can vary, decreasing to near or below room temperature, the values in Table 1 are not absolute. The numbers in Table 1 were obtained at 22° C. all within one hour.

For joining wood panels not more than 1 PSIG of pressure was used to maintain reasonable joining. To join sheets 70 min PLA and 70 min (10 wt % Proviplast 25422) PLA slugs were used in a Power Adhesives TEC 6300 pneumatic glue gun. Air pressure was set at 80 PSI on the master lines in the lab and no spraying was utilized. Solid beads of glue were dispensed along the exterior in a square pattern and then an X pattern to all four corners was applied to the substrate surface. At this point approximately one pound of lead per square inch was placed on top of the joined sheets within 30 seconds of initial glue dispensing. The working time for each variety of glue glug was measured to be 30 seconds (PLA-70) and 60 seconds (PLA-70 with plasticizer). Using extra hand pressure it was possible to get up to 90 seconds of working time with plasticized PLA-70 but it made virtually no difference with pure PLA-70 slugs. The glass transition temperature is significantly reduced with 10 wt. % plasticizer as the pieces can be easily bent and stretched at room temperature. Even warming the material by hand will provide a noticeable difference in flexibility and the resulting product is suitable for hot melt adhesives.

Sheets of 75, 25, and 7 square inches were also joined by the described adhesives.

Veneer (countertop material) sheet is very thin (0.035") and requires a more precise adhesive layer thickness to produce visually appealing specimens. To accomplish this plasticized (10 wt % Proviplast 2542) PLA-70 slugs were loaded into the TEC 6300 spray gun and a 1-2" wide spray pattern was used to thinly coat the wood sheet. A sheet of veneer was then placed on top of the hot adhesive and rolled flat to join the surfaces. Although decent adhesion results immediately, the entire joined specimen was placed into a 400° F. oven for 35 minutes and pressed together using 0.04 PSI applied pressure to prevent the veneer from flexing due to heat.

Example 11

This example demonstrates the preparation of hot glue adhesive slugs that can be used for spray based joining of specimens of plywood, veneer and fabric.

PLA adhesive hot glue slug materials were formulated in two batches as follows:

PLA adhesive-1 was based 100% on use of raw PLA resin as feedstock utilized to formulate and form the product suitable for dispensation from an off-the-shelf commercial pneumatic spray hot glue gun model. Such a gun can be used to deliver hot glue in various spray patterns, but, importantly, also in solid bead form. A total of 15 PLA adhesive-1 individual slugs (each weighing about 67 g and about 1.75" OD) were prepared PLA adhesive-2 was formulated in similar fashion to PLA adhesive-1 but with the addition of 10 wt. % of 100% bio-based plasticizer additive (Proviplast® 25422).

Dispensation in bead and spray form: PLA adhesive-1 and PLA adhesive-2 glue slugs both are amenable to be dispensed directly from TEC 6300® glue gun with and without air pressure.

Temperature: In room temperature environments, the direct dispensation in form of solid beads allows for up to about 90 seconds of working time (i.e., time available to overlay another sheet of plywood or veneer and apply modest pressure) and good bonding strength (in the range of several hundred to several thousand psi tensile strength). Much shorter times can be used. Joined materials are ready for use without overnight curing.

Preferably to maintain strength between connected sheets the molten PLA adhesive material applied to a base substrate at or above about 100° C. (whereby, the level of "tack" is significant). If the temperature drops below 100° C. (with overlaid sheet which has not yet bonded on to the intervening layer of PLA adhesive which is bonded on to the base substrate) the temperature should be reheated to above about 100° C. (preferably to about 150° C.).

Pressure: The pressure required for composite samples we used as baseline was about 1 psig, although, lower pressures can be used.

Time: The time at temperature and pressure evaluated in our laboratory studies at various scales to attain good bonding was in the range of about 5 to 10 seconds after application of PLA adhesive and placement of the overlaid material (either another plywood sheet or veneer).

Bond Strength and Flexibility: The Shore D hardness scale was used to characterize the hardness of the PLA adhesive glue slugs being transmitted.

An average value was found to be about 74 (PLA adhesive-1) and about 41. (PLA adhesive-2). The hardness directly correlates to flexibility (or degree of plasticity delivered by the product). It has been observed that hardness and tensile strength are directly related and flexibility is inversely related to these characteristics.

| Parameters pertaining to accompanying samples | |
|---|---|
| Parameter | Description |
| Applicator | Model TEC 6300 ™ (from Power Adhesives); 80 psi air pressure; dispensing via beads or spray; for bonding a small sample of veneer to veneer we used an off-the-shelf PRO 200 ® hot glue gun. |
| Plywood Type | ¼" thick sheets from hardware stores |
| Plywood Sizes | 18 in$^2$; 25 in$^2$, 75 in$^2$ |
| Veneer | From hardware stores; thickness about 0.035"; 95 in$^2$ |
| Hot Glue | PLA adhesive-1 and PLA adhesive-2 |
| Pressure level overlay | about 1 psi(g) to about 0.04 psi(g) via lead bricks or marble slabs |
| Ambient Pressure | about 20° C. |

For joined plywood sheets, the air pressure was about 80 psi but spray functionality was turned off. Solid beads of glue were dispensed across the edges of the base substrate in a square pattern and then an "X" pattern was created between the four corners. This took on average about 20 seconds. At this point another plywood sheet was placed over the substrate and using lead brick overlay, pressure was utilized in the range of about 1 psi(g) for about 10-20 seconds. It was found that the working time in this room temperature environment is about 30 seconds (for PLA adhesive-1) and about 60 seconds (for PLA adhesive-2); using additional hand pressure it was possible to get up to 90 seconds with PLA adhesive-2 glue glugs but it made virtually no difference when using PLA adhesive-1.

When the base substrate is given a spray coated surface before a thin (about 0.035") veneer sheet was overlaid on to it. Due to the very thin overlay material and to allow for some degree of flexibility, the joining was done using PLA adhesive-2. For this situation and to demonstrate the capability to dispense in spray format, PLA adhesive-2 was dispensed in spray form using a 1-2" wide spray pattern to thinly coat the base plywood substrate over about 10-20 seconds. The sheet of veneer was placed on top and rolled flat with a rolling pin which gave rise to a visually well joined system. The joined system can be placed in an oven at about 200° C. with pressure to maintain even pressure across the surface to keep the substrate from warping using a net pressure of about 14 oz. (i.e., about 0.04 psi(g)).

Using this technique a veneer sheet can be bonded to another veneer sheet (using a commercial PRO 200® hot glue gun). PLA adhesive-2 was used for this purpose. The resultant system can be flexed without failure.

In addition fabrics can be joined together using PLA adhesive-2 which was dispensed in spray form from the TEC 6300®. This system demonstrates even more vividly the capacity to bend and flex the resultant composite system.

Example 12

This example demonstrates the use of polylactic acid product, PLA adhesive-30-0, to coat veneer panels. The identifier system used in this example provides the amount of time the PLA adhesive is heated at 250° C. The next number indicates the level of accumulated irradiation dose in kGy and the third number represent the thickness of the applied adhesive in grams per square meter. The identifier "30-0-300" indicates a sample was prepared by heating PLA to 250° C. for 30 minutes, no irradiation, and the adhesive layer was applied at 300 g/m².

PLA adhesive coating is a 100% biodegradable coating derived from polylactic acid feedstock. It is applied to veneers under 600 psig and a 200° C. thermal environment. In this example, PLA adhesive is applied to veneers while in a 200° C. thermal environment, but without the overpressure applied. After removal from the oven, the veneer was subject to approximately 15-20 psig (using a stack of bricks) and allowed to cool to room temperature. This cooling period lasted approximately 30 minutes. The two coats applied in this example were an average of either 300 g/m² or 150 g/m².

For determining and optimizing coating thickness a 28×28 cell grid was prepared with each grid location being 1 cm×1 cm at the boundaries. This allows 784 individual locations to dispense adhesive over about 1 square foot. For out tests coatings in the 150-300 g/m² range proved useful. Very consistent results were observed for 300 g/m² coverage in all sample sizes. However it was necessary to use an alternating void cell method with 300 g/m² in one cell followed by no material in the next to get substrate failure with 150 g/m² average coverage levels. Using this technique samples ranging from about 1 square inch up to about 10 square inches showed similar results, which was not the case when attempting to produce samples at the lower end of adhesive coverage using uniform distribution. Sieved (500-1180 micron) PLA adhesive powder was used.

The procedure applied is described in ASTM D906 in which a certain geometry is specified as depicted in FIG. 16.

The grain of the veneer is unidirectionally stacked, oriented in the tensile testing direction in order to provide the most challenging environment for the PLA adhesive. This provides for the strongest orientation of the substrate and therefore the most challenging environment for the adhesive.

A summary of the key test parameters and results for each are shown below for PLA adhesive 30-0-300 and PLA adhesive 30-0-150 coated panel samples:

| | | | Failure Load Divided by Adhesive Area | | | | | |
|---|---|---|---|---|---|---|---|---|
| Sample ID | Coverage [g/m^2] | Load [Newtons] | Load [lbF] | Length [in] | Width [in] | Area [in^2] | PSI | AVG |
| 300-1 | 300 | 573.75 | 128.52 | 0.630 | 1.110 | 0.699 | 183.78 | |
| 300-2 | 300 | 405.31 | 90.79 | 0.563 | 0.825 | 0.464 | 195.47 | 218.80 |
| 300-3 | 300 | 600.23 | 134.45 | 0.495 | 0.980 | 0.485 | 277.16 | |
| 300.2-1 | 150 | 994.94 | 222.87 | 1.118 | 1.010 | 1.129 | 197.37 | |
| 300.2-2 | 150 | 1421.94 | 318.51 | 1.166 | 0.931 | 1.086 | 293.41 | 257.67 |
| 300.2-3 | 150 | 1537.07 | 344.30 | 1.138 | 1.072 | 1.220 | 282.23 | |

The stress evaluations indicate some variability from sample to sample, and in general the coupon samples with 300 g/m² were smaller than those done with 150 g/m². However, in all cases, despite the variability in these initial tests for strength, the substrate failed. The results are promising given that the veneer sheets were applied in a 200° C. thermal environment, but without the 600 psig overpressure applied, and only approximately 15-20 psig applied after removal from the oven.

Additional testing was performed to gage the effect of higher pressures of about 200 psi for sample #s 62-65. The approach also involved placement of coupons (sample #66-69) between steel plates on each side of the veneer sample. This combination was placed in the oven at 200° C. as before but instead of placing 150 lb of lead bricks which provided a pressure of about 50 psi, the steel plate enclosed coupons were subject to 200 psi. A key difference in use of such a method is that the thick steel plates retain significant energy after removal from the oven and therefore more closely resembles the combined higher pressure of up to about 600 psi and 200° C. for industry application protocols. The table below summarizes results of testing with 50 psi and also 200 psi pressures for various coating types with and without irradiation and for varied levels of mass of adhesive.

| Sample # | Adhesive Type | Coverage [g/m^2] | Width [in] | Length [in] | Area [in^2] | Load [lbF] | Shear Strength [psi] | Substrate Failure [85%+] |
|---|---|---|---|---|---|---|---|---|
| | | Prepeared at 50 psi using 150 lbs of lead bricks | | | | | | |
| 57 | 30-0 | 100 avg | 1.16 | 1.02 | 1.19 | 161.98 | 136.66 | No |
| 60 | 30-0 | 100 even | 1.13 | 0.98 | 1.10 | 304.06 | 275.79 | No |

| Sample # | Adhesive Type | Coverage [g/m^2] | Width [in] | Length [in] | Area [in^2] | Load [lbF] | Shear Strength [psi] | Substrate Failure [85%+] |
|---|---|---|---|---|---|---|---|---|
| 58 | 30-15 | 200 even | 1.12 | 0.99 | 1.11 | 223.77 | 202.33 | No |
| 59 | 30-15 | 300 even | 1.15 | 1.03 | 1.18 | 489.18 | 413.52 | Yes |
| | | Repeated with hydraulic jack method ~200 psi | | | | | | |
| 62 | 30-0 | 100 avg | 1.02 | 1.01 | 1.03 | 298.99 | 289.08 | No |
| 63 | 30-0 | 100 even | 1.01 | 0.96 | 0.97 | 205.77 | 212.62 | No |
| 64 | 30-15 | 200 even | 0.94 | 0.88 | 0.83 | 325.26 | 391.96 | No |
| 65 | 30-15 | 300 even | 0.96 | 0.99 | 0.95 | 269.43 | 283.75 | Yes |
| | | Using steel plates for thermal enhancement | | | | | | |
| 66 | 30-0 | 100 even | 1.002 | 0.986 | 0.99 | 218.29 | 220.95 | Yes |
| 67 | 30-0 | 100 even | 1.019 | 0.931 | 0.95 | 451.49 | 475.91 | Yes* |
| 68 | 30-0 | 100 even | 1.006 | 0.973 | 0.98 | 210.2 | 214.74 | Yes |
| 69 | 30-0 | 100 even | 1.000 | 0.955 | 0.96 | 442.81 | 463.68 | Yes |

*Test error occurred and the sample was not able to propagate failure before loading stopped.

As shown in the Table above the application of 200 psi without simultaneous higher thermal energy did not in success for mass applications in the 100 g/m² range for PLA adhesive 30-0. Similar results were also obtained for 200 g/m² thickness when adhesive was irradiated with 15 kGy. It has been observed that irradiation improves the strength and water resistance of PLA adhesive but also increases the viscosity and melting temperature. This was not the case for the thicker 300 g/m² coated samples even when irradiated with 15 kGy. Simultaneous high temperature and pressure resulted in 100% success for all 4 samples even at a coverage of 100 g/m² (i.e., samples 66-69).

Thus, using this technique and PLA adhesive-30-0 adhesive a veneer sheet can be bonded to another veneer sheet under 600 psig and in a 200° C. thermal environment. The resultant system can resist shear and the substrate veneer sheets fail before the adhesive.

Example 13

This example demonstrates the superior qualities of PLA adhesive PLA-30%-15 wt. % plasticizer 25422 over Surebonder® 702 and 727 brand adhesives used for cardboard packaging. The shear strength per mass of adhesive when applied to an engineered wood composite substrate was compared between several samples of PLA adhesive and Surebonder® adhesives.

All samples are primarily PLA resin based with the addition of a plasticizer (Proviplast® 25442 and 25102, 100% bio-based, acquired from Proviron®). The weight percent of each plasticizer is listed along with the resulting average Shore D hardness. Shore D hardness values were determined after ten seconds, when the value is stabilized, and represent an average of four points on the glue stick:

SA/PU 1—100% PLA based rigid hotmelt with a Shore D hardness of about 81. and a set time of 5 seconds.

SA/PU 1B—100% PLA based rigid hotmelt with a Shore D hardness of about 70, a set time of 5 seconds, and lower viscosity than SA/PU-1 which allows for enhanced gap filling.

SA/PU 2—PLA based slightly flexible hotmelt with 10 wt % Proviplast 25422, Shore D hardness of about 54, and a set time of 5 seconds.

SA/PU 3—PLA based flexible hotmelt with 18.5 wt % Proviplast 25422, Shore D hardness of about 51, and a set time of 20 seconds.

SA/PU 4—PLA based slightly flexible hotmelt with 10 wt % Proviplast 25102, Shore D hardness of about 68, and a set time of 10 seconds.

Surebonder 702—Flexible hotmelt, Shore D hardness of about 46, and a set time of 15 seconds.

Surebonder 727—Very flexible hotmelt, Shore D hardness of about 33, and a set time of 40 seconds.

In order to determine the set time of each sample, approximately 1 gram of adhesive was dispensed across an 8.5 cm×11 cm section of corrugated cardboard and a timer was used to specify a set interval before testing for fiber tearing.

If the adhesive was still liquid and removed no fiber, it was marked "No Fiber Tearing," or NFT. If the test was performed before an adhesive had fully set, it will be marked "Partial Fiber Tearing," or [PFT]. If no portion of the test area was still attached at the designated time interval, it will be marked Full Fiber Tearing," or [FFT]. The minimum time required to achieve full fiber tearing [FFT] is defined as the set time for a given adhesive type. The results are shown below:

| Adhesive ID | Time Interval [sec] | | | | | | | Measured Set Time [sec] |
|---|---|---|---|---|---|---|---|---|
| | 5 | 10 | 15 | 20 | 25 | 30 | 40 | |
| SA/PU-1 | FFT | — | — | — | — | — | — | 5 |
| SA/PU-1B | FFT | — | — | — | — | — | — | 5 |
| SA/PU-2 | FFT | — | — | — | — | — | — | 5 |
| SA/PU-3 | NFT | PFT | PFT | FFT | — | — | — | 20 |
| SA/PU-4 | PFT | FFT | — | — | — | — | — | 10 |
| 702 | NFT | PFT | FFT | — | — | — | — | 15 |
| 727 | NFT | NFT | — | NFT | PFT | PFT | FFT | 40 |

Further testing was done to compare Surebonder® 702 and 727 with PLA adhesive PLA-30-15 wt. % plasticizer 25422. The results are summarized below. In general, the PLA based material can be shown as superior using shear strength per mass of adhesive as a metric. As for substrate failure on cardboard, this metric did not prove useful since cardboard would fail well before the adhesive would. The substrate chosen for testing was engineered wood composite. Failure load values quoted are those at which the adhesive failed through rupture.

| | | | ~1 Sq. In. Bond Area | | | | |
|---|---|---|---|---|---|---|---|---|
| Adhesive Type | Sample # | Dry Weight [g] | Wet Weight [g] | Adhesive Mass [g] | Failure Load [lbf] | Load/Gram | AVG | STD |
| PLA-30 15% 25422 | 1 | 9.0734 | 9.3181 | 0.2447 | 270.56 | 1105.7 | | |
| PLA-30 15% 25422 | 2 | 9.7543 | 10.0491 | 0.2948 | 310.57 | 1053.5 | 1077.3 | 26.4 |
| PLA-30 15% 25422 | 3 | 11.0755 | 11.3214 | 0.2459 | 263.78 | 1072.7 | | |
| Surebonder 702 | 1 | 8.7896 | 8.9920 | 0.2024 | 134.97 | 666.8 | | |
| Surebonder 702 | 2 | 10.4659 | 10.7372 | 0.2713 | 210.59 | 776.2 | 789.8 | 130.3 |
| Surebonder 702 | 3 | 9.7485 | 10.0233 | 0.2748 | 254.57 | 926.4 | | |
| Surebonder 727 | 1 | 9.5528 | 9.7669 | 0.2141 | 400.26 | 1869.5 | | |
| Surebonder 727 | 2 | 10.6998 | 10.9098 | 0.2100 | 327.50 | 1559.5 | 1758.9 | 173.0 |
| Surebonder 727 | 3 | 9.4537 | 9.6559 | 0.2022 | 373.62 | 1847.8 | | |

This example illustrates the 30% enhanced strength per gram of adhesive when compared to Surebonder® 702. Because the density of PLA adhesive adhesives is approximately 50% greater than that for Surebonder® (about 1.5 g/cc vs about 1 g/cc) this translates into approximately 100% greater strength per unit volume of dispensed adhesive. Such a feature presents significant utility when application is for situations where space storage or thickness of samples is important.

It was further found that the adhesive delivery rate for PLA adhesive is similar to that for the Surebonder® 702 and 727 adhesives for which the viscosity is stated to be around 6,000 cps at the 350° F. application temperature. PLA-30 with 15 wt. % plasticizer readily possesses such a viscosity level and can be lowered further by use of irradiation and/or leaving the adhesive in the spray or applicator gun for 10-15 min. ahead of dispensation to provide enhanced delivery rates.

The disclosed PLA adhesive. (30-0 and 30-20 type formulations with and without plasticizers) can be used in the manufacture of cardboard in place of a starch-borax-resin-caustic soda based adhesive. The set times for use of the disclosed PLA adhesive which are governed by evaporation of water and drying in conventional methods can be reduced by several times using the presently disclosed PLA adhesives.

Example 14

This example demonstrates the enhanced performance of PLA adhesive irradiated-PLA adhesives under marine application standard and water-soaking conditions as compared to non-irradiated PLA adhesives.

The first set of tests, which were conducted with commercial veneer panels, were for assessment for marine applications which involve resistance to degradation under boiling water conditions (12 hours total), and separately, for assessment for performance under water-soaked conditions. PLA adhesive was in powder form produced by grinding cast PLA adhesive glue sticks which were next irradiated using a $Co^{60}$ irradiator. In a boiling water environment the most successful result exhibited partial substrate failure after the sample was subjected to 5 hours and 53 minutes submersed in boiling water.

The sample (a 2"×0.5" cutout of the engineered wood substrate) was prepared by measuring a predetermined quantity of powder adhesive into weigh boats and clamping (using a C-clamp) both top and bottom veneers with adhesive in between at about 600 psi. The clamp was removed and the sample was then placed into a 200° C. oven for 30 minutes to bond. The sample was removed and allowed to cool before testing in a boiling water environment.

After 5 hours and 53 minutes in boiling water the sample was removed and tested wet for substrate failure. The result was about 50% substrate failure which is significantly better than the results we witnessed from most all other test cases. Some samples lasted only 15 minutes in a boiling bath; other samples took 3-4 hours before falling apart by themselves, in boiling water. With further testing it was found that the PLA adhesive-30-31 adhesive burns before melting and does not flow readily. Due to the high level of cross linking at 31 kGy this was expected and indicates that for practical plywood industry usage less than 30 kGy of irradiation should be used unless the non-irradiated PLA adhesive-30-0-xx, for example, is first applied (with inclusion of TAIC or some other cross-linking agent) to the plywood veneers to join them at or below 200° C. with or without overpressure. The joined substrates can then be strengthened by irradiating the composite together to the desired levels of strength and water resistance.

For resistance to water at room temperature the most effective tests were conducted with PLA adhesive-30-20-xx adhesive. Two samples were prepared at 300 g/m² and both exhibited substrate failure. The first was tested immediately after about 24 hours soak time in room temperature water; the other was allowed to dry for 65 hours before testing.

For tests using non-irradiated PLA adhesive 30-0-300 and also 30-15-300 samples soaked in water for about 2 h it was found that the samples could generally remain intact but would also exhibit substrate failure before the adhesive failed.

The above test data reveal that pre-irradiation assisted cross-linking of PLA adhesive 30-0 adhesive can be expected to provide for very significant enhancement in properties when applied to substrates that may be subject to prolonged water attack at room temperature as well as under boiling water conditions.

PLA adhesive formulations which provided 100% substrate failure without water soaking for 24 h at room temperature allow the joined veneers to remain intact. However, the porous joined specimens cannot be relied upon to provide substrate failure under all conditions. This is determined to be a consequence of the highly porous nature of the plywood veneers which permits the interface between plywood and adhesive to be constantly attacked and weakened. With relatively impervious surfaces such aluminum or steel, soaking in water of the joined specimens does not result in any discernible reduction in bond strength even after days of soaking and examination over several months.

Example 15

In this example a series of compositions of PLA with various kinds and amounts of plasticizer are described, providing various new and useful flexible properties to PLA adhesive formulations of adhesives and coating materials.

Formulations based 100% on raw PLA resin provide high strength to coatings and adhesive bonds. Different blends PLA have been formulated using commercial plasticizers to provide variable strength and elasticity as evidenced by the Shore D hardness of cast specimens designed for use in conventional hot glue guns.

All samples are primarily PLA with the addition of a plasticizer. The weight percent of each plasticizer is listed below along with the resulting average Shore D hardness. Shore D hardness values were determined after 10 seconds, when the value is stabilized, and represent an average of four points on the glue stick.

SA/PU 1—Pure PLA, Shore D hardness of 80.6

SA/PU 2—PLA with 10 wt % Proviplast 25422, Shore D hardness of 54.0

SA/PU 3—PLA with 18.5 wt % Proviplast 25422, Shore D hardness of 51.0

SA/PU 4—PLA with 10 wt % Proviplast 25102, Shore D hardness of 67.8

SA/PU 5—PLA with 10 wt % Proviplast 2624, Shore D hardness of 63.9

SA/PU 6—PLA with 10 wt % TRIC, Shore D hardness of 79.4

The plasticizers used were TAIC (Triallyl Isocyanurate, acquired from Sigma Aldrich), Proviplast® 25442 (100% bio-based, acquired from Proviron), Proviplast® 25102 Proviplast® 25442 (100% bio-based, acquired from Proviron), and Proviplast® 2624 (partly bio-based, acquired from Proviron).

To produce these glue sticks, a test tube with 30 grams of PLA was placed into a 255° C. oil bath for 30 minutes. To incorporate the plasticizer, a measured (via micro balance) amount of material was placed into a syringe and injected one minute prior to casting. In order to mix thoroughly, a copper rod was used to mechanically stir the melt with 20 cyclic motions. To determine the effectiveness of this method, one sample containing green dye was produced and the coloring was found to be evenly distributed. Although it appears that the dye is evenly distributed, there is still reasonable variation of harness values along the cast sticks. For reference, these values were following, where the top and bottom of the cylinder were tested along with two equidistant points along the circular portion.

The following table summarizes the Shore D findings of this procedure:

| Shore D Values | | | | | | |
|---|---|---|---|---|---|---|
| Sample ID | 1 | 2 | 3 | 4 | Average | Spread |
| SA/PU 1 | 83.5 | 79.5 | 79.5 | 80 | 80.6 | 4 |
| SA/PU 2 | 60 | 58 | 52 | 46 | 54.0 | 14 |
| SA/PU 3 | 46 | 43.5 | 53 | 61.5 | 51.0 | 148 |
| SA/PU 4 | 66 | 70 | 68 | 67 | 67.8 | 4 |
| SA/PU 5 | 71 | 59.5 | 62.5 | 62.5 | 63.9 | 11.5 |
| SA/PU 6 | 78 | 79 | 81 | 79.5 | 79.4 | 3 |

Thus, these results show that varying degrees of hardness can be achieved by adding varying combinations of plasticizer type and amount to PLA adhesive formulations.

Example 16

In this example PLA adhesive PLA is formed into pastille shaped beads and compared to a commercially available product from NatureWorks.

A stamped aluminum sheet was used to produce 20 PLA adhesive PLA beads which were then weighed and measured. Physical properties of the beads are shown in the table below. The standard deviation provided is for the entire population of 20 beads.

| | PLATech Beads | | Natureworks Resin |
|---|---|---|---|
| Sample # | Mass [g] | Thickness [nm] | Mass [g] |
| 1 | 0.0381 | 1.64 | 0.0394 |
| 2 | 0.0384 | 1.58 | 0.0356 |
| 3 | 0.0347 | 1.72 | 0.0383 |
| 4 | 0.0338 | 1.60 | 0.0385 |
| 5 | 0.0369 | 1.50 | 0.0400 |
| 6 | 0.0404 | 1.74 | 0.0352 |
| 7 | 0.0355 | 1.74 | 0.0351 |
| 8 | 0.0352 | 1.68 | 0.0353 |
| 9 | 0.0364 | 1.58 | 0.0454 |
| 10 | 0.0378 | 1.62 | 0.0483 |
| 11 | 0.0381 | 1.78 | 0.0363 |
| 12 | 0.0395 | 1.72 | 0.0349 |
| 13 | 0.0382 | 1.70 | 0.0403 |
| 14 | 0.0402 | 1.60 | 0.0357 |
| 15 | 0.0336 | 1.45 | 0.0349 |
| 16 | 0.0347 | 1.56 | 0.0416 |
| 17 | 0.0292 | 1.42 | 0.0375 |
| 18 | 0.0346 | 1.60 | 0.0438 |
| 19 | 0.0327 | 1.66 | 0.0438 |
| 20 | 0.0400 | 1.68 | 0.0444 |
| Average | 0.0364 | 1.6285 | 0.0392 |
| Pop. Std. Dev. | 0.0028 | 0.0948 | 0.0039 |

The PLA adhesive PLA beads are comparable in size with the commercially available PLA beads from NatureWorks.

Example 17

This example describes the delivery of PLA adhesive to substrates under normal temperature conditions using an aqueous carrier.

Powdered PLA adhesive (30-0-0) granules having an average diameter in the range of about 500 micron to 1,180 microns can be mixed in water and sprayed onto glass. Upon evaporation, the glass substrate was left covered with adhered PLA powder in a largely uniform coating. A second substrate can then be placed on the coating. In certain methods this can be followed by heating the coated substrate to about 150° C. to melt the PLA adhesive and join the glass substrate to the overlaid substrate. (e.g., panels of cardboard to the PLATech. coated corrugated substrate). This method is amenable to any of the described substrates.

Example 18

This example describes a method to remove the adhesive from substrates.

A simple means to remove the adhesive is to heat the substrate with adhesive to close to the melting temperature of the adhesive. Since the adhesive melting temperature can be tailored, as described earlier (by a combination of thermal/irradiation/plasticizer based pre-processing, that value is a known quantity ranging from around 140° C. to upwards of 200° C. depending on the level of cross-linking attained.

For porous substrates, where the PLA adhesive was not prepared using a cross-linking agent and irradiation, the substrate containing PLA adhesive may be removed by submersing the substrate in boiling water for about 5-15 minutes.

Example 19

This example describes an assessment of ambient temperature related performance of joined wood and aluminum substrates. The PLA adhesive of this invention (without irradiation or addition of plasticizer) was applied to join wood and aluminum substrates (T-bars) and then maintained in a −20° C. environment and tested over time to assess loss of adhesion. It was verified via normal handling pressure by hand that the substrates taken from −20° C. to +20° C. did not result in failure even after months of observation. Since the adhesive is a hot-melt glue, the elevation of temperature for limited periods of time towards Tg and above (e.g., 100° C.) followed with return to room temperature actually would go towards healing any crack propagation. This demonstrates that joined substrates can be used in a thermal cycling environment, such as in automotive applications. The use of plasticizers and/or cross-linking (via irradiation) promoted improvements in flexibility, temperature and moisture stability lends itself to use under conditions of relative wide temperature variations (thermal-cycling type scenarios).

The invention claimed is:

1. A method for producing an adhesive comprising melting an adhesive comprising a heated, irradiated, crosslinked polylactic acid, wherein the crosslinks are introduced by irradiation, and treating the melted adhesive at a temperature in range of about 240° C. to about 270° C. for about 10 minutes to about 100 minutes prior to use.

2. The method for producing an adhesive of claim 1, wherein the polylactic acid is irradiated using an electron beam or an isotope.

3. The method for producing an adhesive of claim 1, wherein the adhesive has a melting temperature in the range of about 140 to about 210° C.

4. The method for producing an adhesive of claim 1 further comprising adding a plasticizer ranging in concentration from about 0.5 wt. % to about 20 wt. %.

5. The method for producing an adhesive of claim 1 further comprising adding a plasticizer ranging in concentration from about 0.5 wt. % to about 20 wt. %, wherein the plasticizer is chosen from the group of biodegradable plasticizers consisting of di-tetrahydrofurfuryl-succinate, bis (tetrahydrofurfuryl-2-ylmethyl)butanedioate, ethoxylated aliphatic diester; and bis (2-(2-butoxyethoxy)ethyl)adipate.

6. The method for producing an adhesive of claim 1, further comprising adding a crosslinking agent.

7. The method for producing an adhesive of claim 1, wherein the adhesive produced is a particulate, a bead, in a spray form or in a vapor form.

8. The method for producing an adhesive of claim 1, further comprising grinding a solid adhesive as prepared in claim 1 into a powder with a centrifugal blade impact generator to obtain a powder that can pass through a sieve having a pore size in the range of about 50 to about 1,000 microns.

9. The method for producing the adhesive of claim 1, further comprising grinding a solid adhesive of claim 1 with a burr grinder to obtain flakes.

10. A method for filling cracks and holes in a substrate comprising obtaining an adhesive as produced in claim 1, obtaining a substrate having a crack or hole, and applying the adhesive produced as in claim 1 to the crack or hole in the substrate.

11. The method for filling cracks and holes in a substrate of claim 10 further comprising removing the adhesive by subjecting adhesive to boiling water or by raising temperature to levels in the range of about 140° C. to about 270° C.

12. A method for joining substrates with an adhesive comprising obtaining a first substrate, heating the first substrate to a temperature in the range of 140° C. to about 260° C., applying the adhesive comprising a heated, irradiated, crosslinked polylactic acid, wherein the crosslinks are introduced by irradiation, to a surface of the first substrate, and placing a second substrate in contact with the surface of the first substrate having the applied adhesive to form a joined substrate.

13. The method for joining substrates of claim 12, further comprising heating the adhesive of claim 1 to about 240° C. to about 270° C. for about 20 to about 75 minutes.

14. The method for joining substrates of claim 12, wherein the applying of the adhesive is by spreading and coating of the first substrate with powdered adhesive granules having an average particle diameter in the range of about 50 to 1000 microns and heating the first substrate to about 160° C. to about 200° C.

15. The method for joining substrates of claim 12, wherein the applying of the adhesive is by spreading and coating of the first substrate with powdered adhesive granules having an average particle diameter in the range of about 500 to 1000 microns and heating the first substrate to about 160° C. to about 200° C. with a PTFE sheet compressed overlay.

16. The method for joining substrates of claim 12, wherein the adhesive is applied as a powdered adhesive in an aqueous slurry.

17. The method for joining substrates of claim 12, further comprising placing the joined substrates under pressure, wherein the pressure can range from under 1 psig to over 600 psig.

18. The method for joining substrates of claim 12, further comprising removing the adhesive by subjecting adhesive to boiling water or by raising temperature to levels in the range of about 140° C. to about 270° C.

* * * * *